(12) United States Patent  (10) Patent No.: US 7,841,730 B2
Hara et al.  (45) Date of Patent: Nov. 30, 2010

(54) LIGHT SOURCE DEVICE AND CRYSTAL DISPLAY DEVICE

(75) Inventors: Kazutaka Hara, Ibaraki (JP); Naoki Takahashi, Ibaraki (JP); Kentarou Takeda, Ibaraki (JP); Miki Shiraogawa, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 536 days.

(21) Appl. No.: 10/570,141

(22) PCT Filed: Aug. 20, 2004

(86) PCT No.: PCT/JP2004/012007
§ 371 (c)(1),
(2), (4) Date: Mar. 1, 2006

(87) PCT Pub. No.: WO2005/024295
PCT Pub. Date: Mar. 17, 2005

(65) Prior Publication Data
US 2007/0014127 A1  Jan. 18, 2007

(30) Foreign Application Priority Data
Sep. 2, 2003  (JP) .............................. 2003-310012

(51) Int. Cl.
*F21V 9/14* (2006.01)
(52) U.S. Cl. .......................... 362/19; 362/607; 362/608; 40/548; 359/487; 359/494; 359/483; 359/497; 359/498; 349/62; 349/65; 349/67; 349/96; 349/113

(58) Field of Classification Search .................. 349/62, 349/65, 67, 96, 97, 113; 362/19, 600, 607, 362/608, 561; 359/63, 487, 494, 483, 497, 359/498; 40/548
See application file for complete search history.

(56) References Cited
U.S. PATENT DOCUMENTS 5,808,709 A * 9/1998 Davis et al. .................... 349/65
6,025,897 A * 2/2000 Weber et al. .................. 349/96
6,124,971 A * 9/2000 Ouderkirk et al. ........... 359/487

(Continued)

FOREIGN PATENT DOCUMENTS
DE  38 36 955  5/1990

(Continued)

OTHER PUBLICATIONS

Japanese Office Action dated Jul. 10, 2008, issued in corresponding Japanese Patent Application No. 2003-310012.

(Continued)

*Primary Examiner*—Jacob Y Choi
(74) *Attorney, Agent, or Firm*—Westerman, Hattori, Daniels & Adrian, LLP

(57) ABSTRACT

A light source comprising sidelight type backlight light guide plate (L), wherein a transmittance angle dependent layer (T1) which transmits normally incident light and reflects obliquely incident light is disposed on one surface of the sidelight type backlight light guide plate (L), and a reflection plate (R) having a repetitive slope structure is disposed on the other surface of the sidelight type backlight light guide plate (L). The invention light source is less in absorption loss due to repetition of light reflection and the like.

10 Claims, 13 Drawing Sheets

U.S. PATENT DOCUMENTS

| | | | |
|---|---|---|---|
| 6,196,692 | B1 | 3/2001 | Umemoto et al. |
| 6,222,598 | B1 | 4/2001 | Hiyama et al. |
| 6,307,604 | B1 | 10/2001 | Hikmet et al. |
| 6,403,223 | B1 * | 6/2002 | Albro et al. .......... 428/421 |
| 6,641,710 | B2 | 11/2003 | Sakura et al. |
| 2002/0034009 | A1 | 3/2002 | Broer et al. |
| 2002/0036735 | A1 | 3/2002 | Arakawa et al. |
| 2003/0001809 | A1 * | 1/2003 | Hattori et al. .......... 345/87 |
| 2004/0085660 | A1 | 5/2004 | Hara |
| 2004/0090577 | A1 | 5/2004 | Hara |

FOREIGN PATENT DOCUMENTS

| | | |
|---|---|---|
| DE | 42 22 028 | 1/1994 |
| EP | 0 578 302 | 1/1994 |
| JP | 2-158289 | 6/1990 |
| JP | 2-242202 | 9/1990 |
| JP | 6-235900 | 8/1994 |
| JP | 9-146092 | 6/1997 |
| JP | 9-506985 | 7/1997 |
| JP | 10-54909 | 2/1998 |
| JP | 10-206850 A | 8/1998 |
| JP | 10-321025 * | 12/1998 |
| JP | 11-242908 A | 9/1999 |
| JP | 2000-48617 A | 2/2000 |
| JP | 2000-214460 | 8/2000 |
| JP | 2001-215505 | 8/2001 |
| JP | 2001-516066 | 9/2001 |
| JP | 2001-521643 | 11/2001 |
| JP | 2002-90535 | 3/2002 |
| JP | 2002-146588 A | 5/2002 |
| JP | 2002-513505 A | 5/2002 |
| JP | 2002-258048 A | 9/2002 |
| JP | 2003-43460 | 2/2003 |
| JP | 2003-222725 | 8/2003 |
| JP | 2003-337333 A | 11/2003 |
| JP | 2003-338212 A | 11/2003 |
| WO | WO 95/17692 | 6/1995 |
| WO | WO 98/35182 A1 | 8/1998 |
| WO | WO 02/25687 | 3/2002 |

OTHER PUBLICATIONS

Japanese Office Action dated Oct. 6, 2008, issued in corresponding Japanese Patent Application No. 2003-310012.

International Preliminary Report on Patentability of Corresponding International Application No. PCT/JP2004/012007 mailed May 11, 2006.

Japanese Office Action dated Apr. 22, 2008, issued in corresponding Japanese Patent Application No. 2003-310012.

International Search Report dated Dec. 14, 2004 of PCT/JP2004/012007.

* cited by examiner

[FIG. 1]
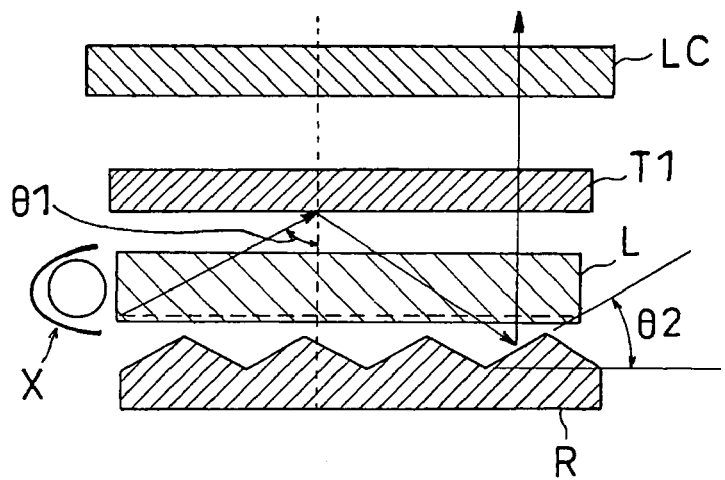
[FIG. 2]
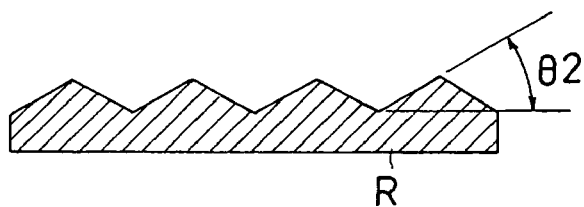
[FIG. 3]
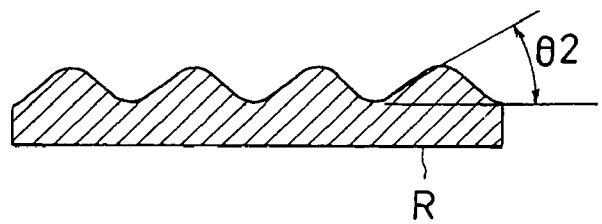
[FIG. 4]
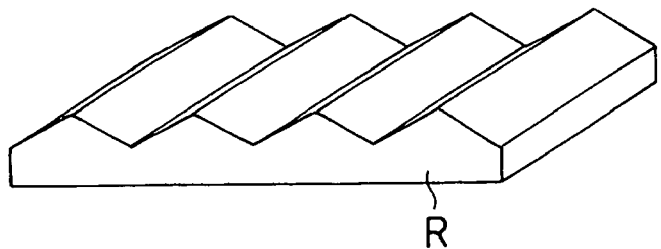

[FIG. 5]
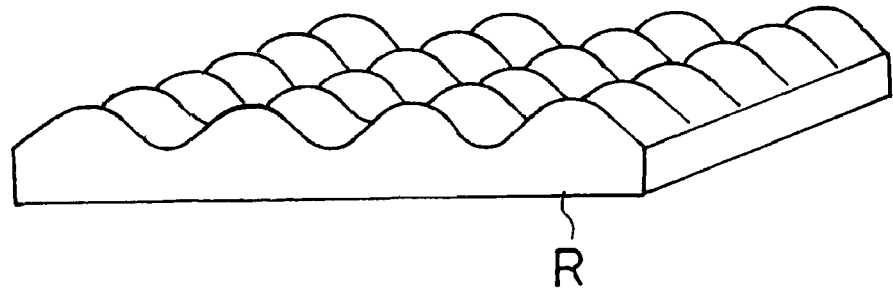
[FIG. 6]
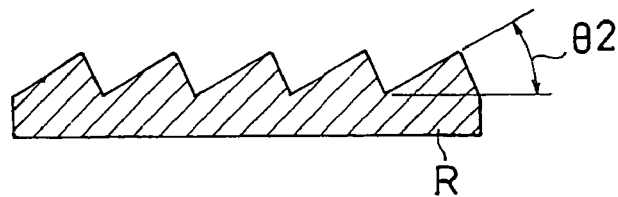
[FIG. 7]
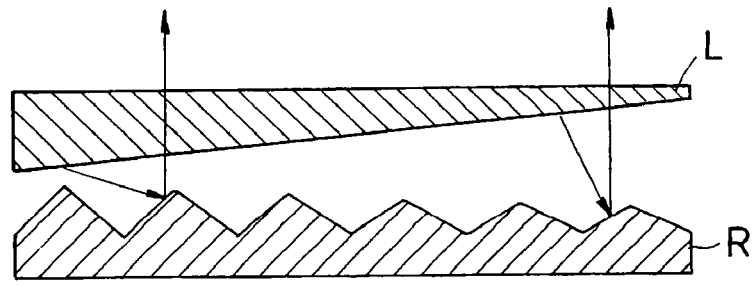
[FIG. 8]
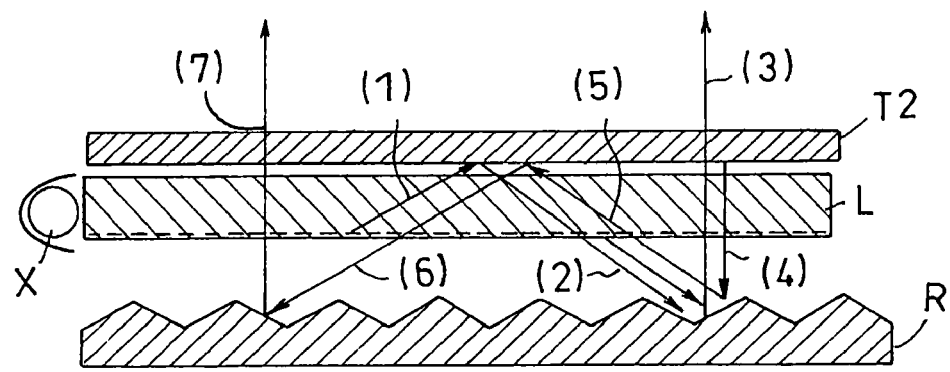

[FIG. 9]
(a)
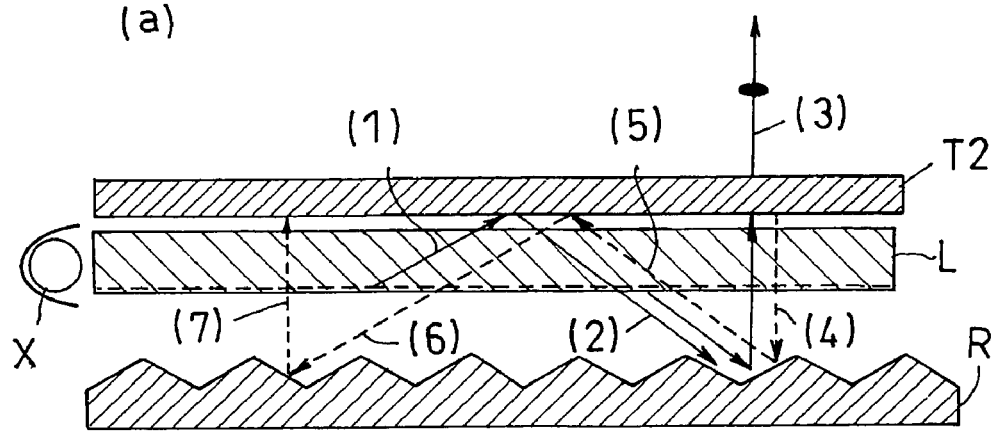
(b)
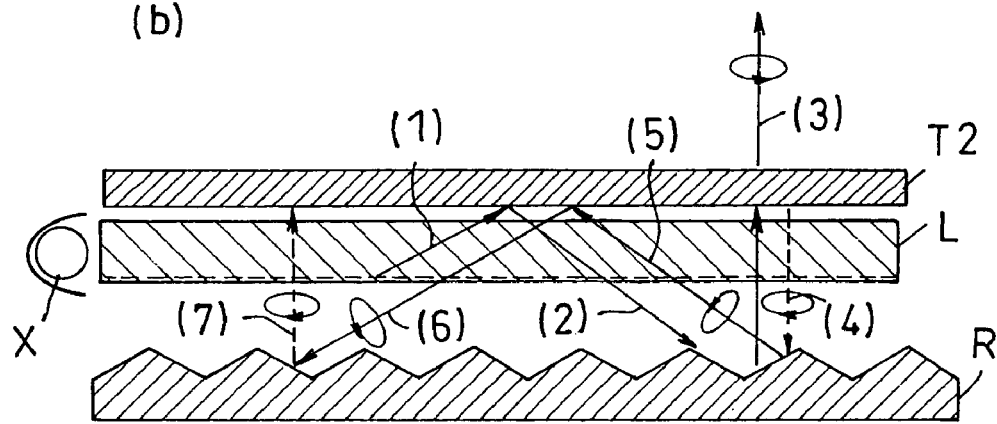

[FIG. 10]
(a)
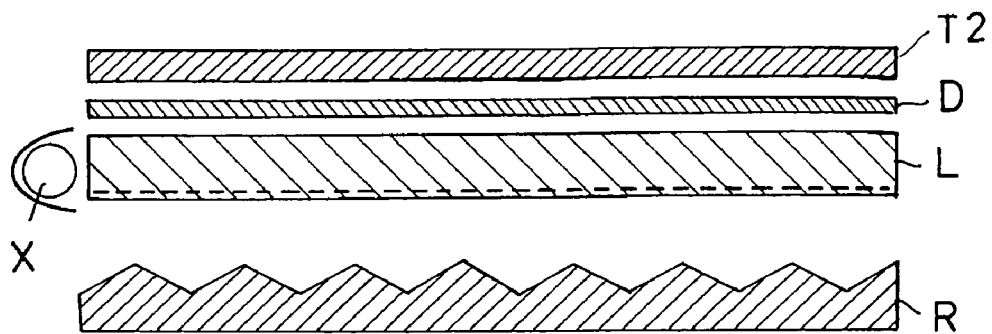
(b)
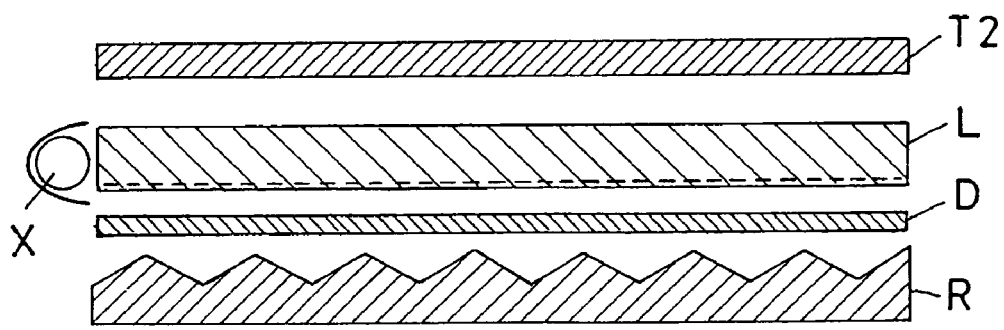
(c)
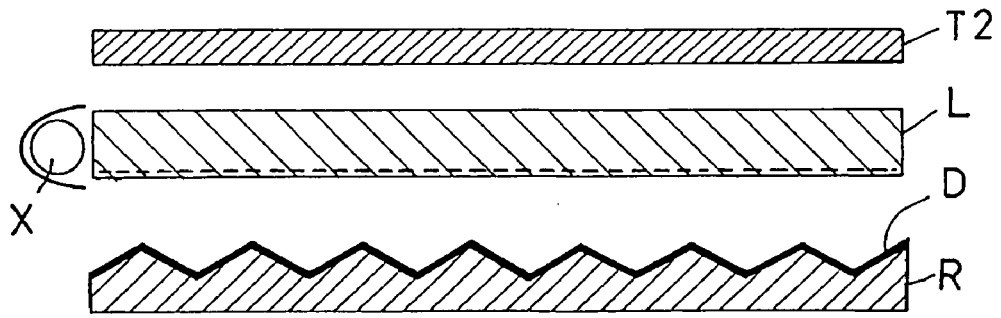

[FIG. 11]
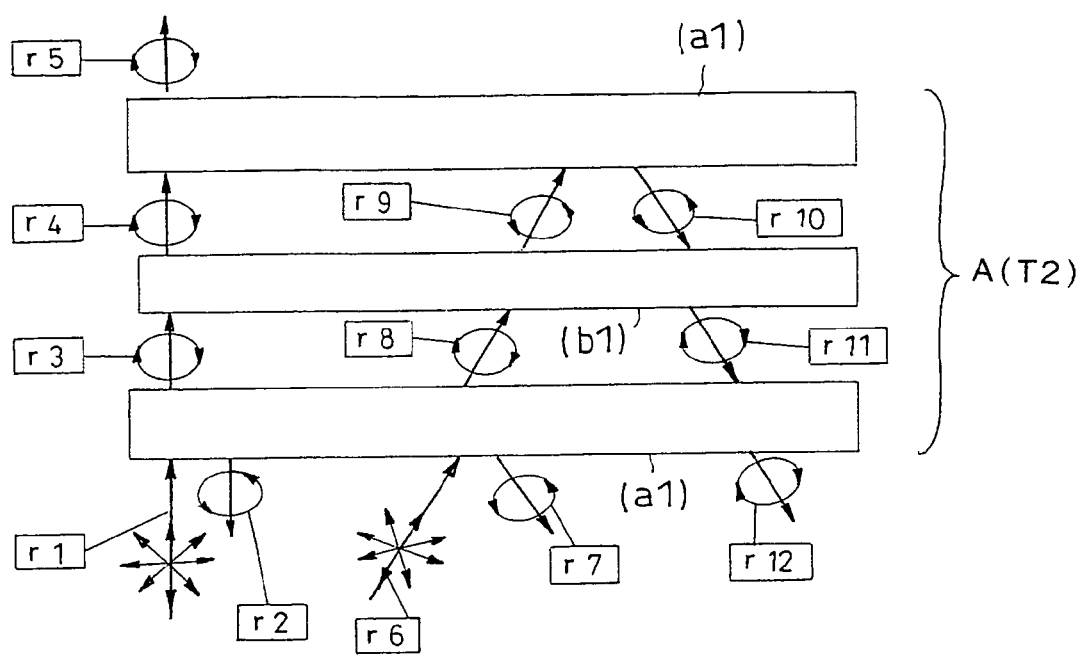

[FIG. 12]
(i)
(ii)-1  (ii)-2
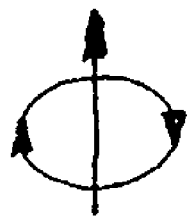  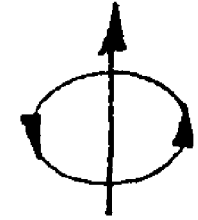
(iii)-1  (iii)-2
  

[FIG. 13]
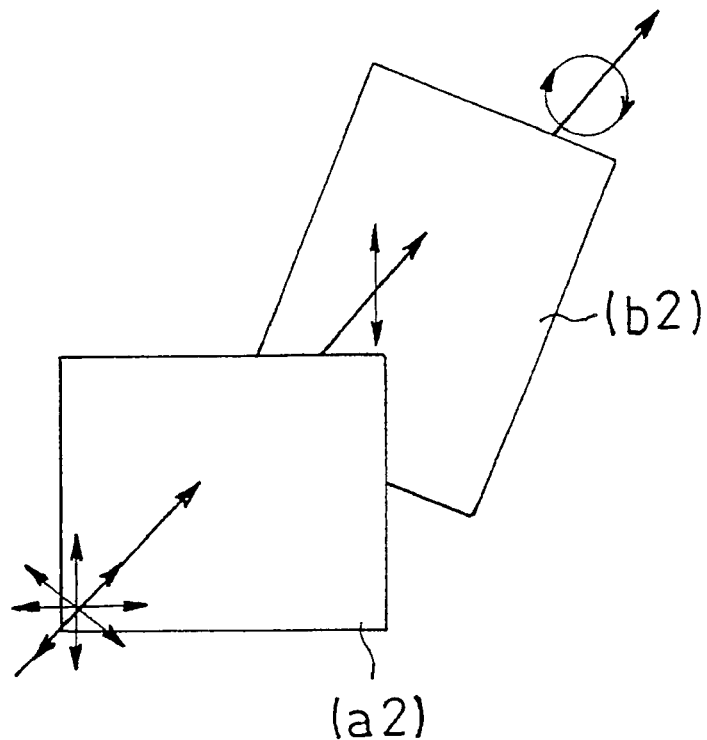
[FIG. 14]
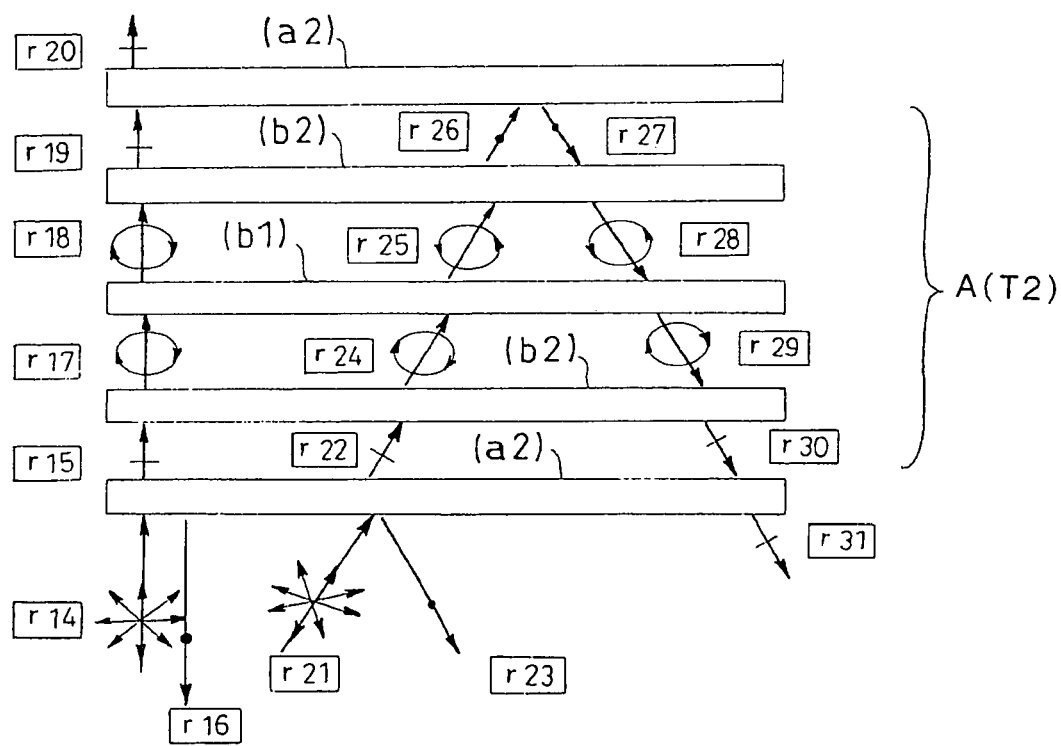

[FIG. 15]
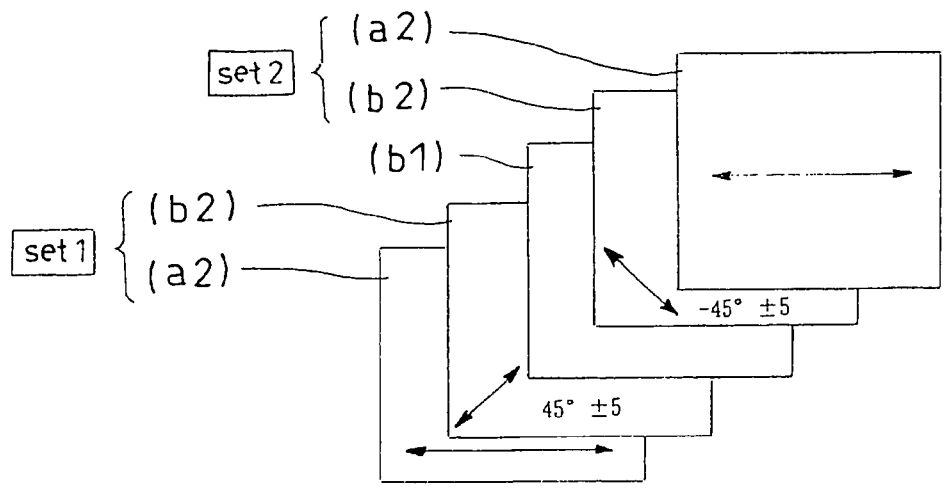
[FIG. 16]
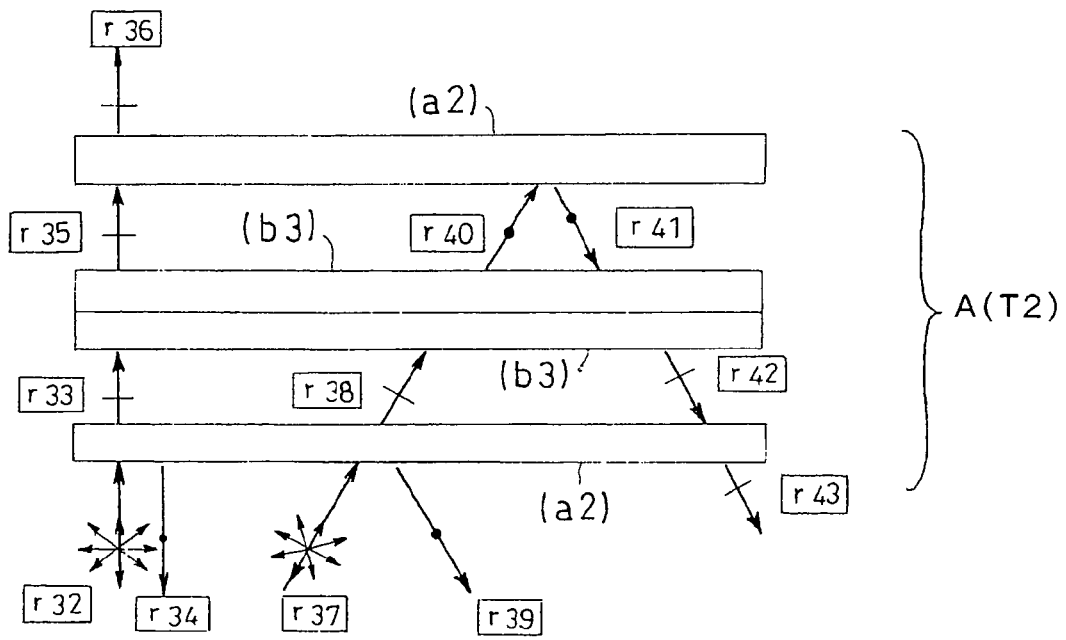

[FIG. 17]
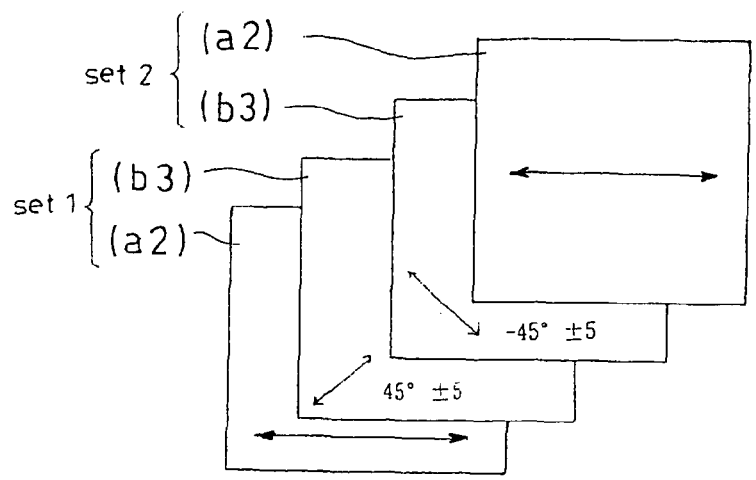
[FIG. 18]
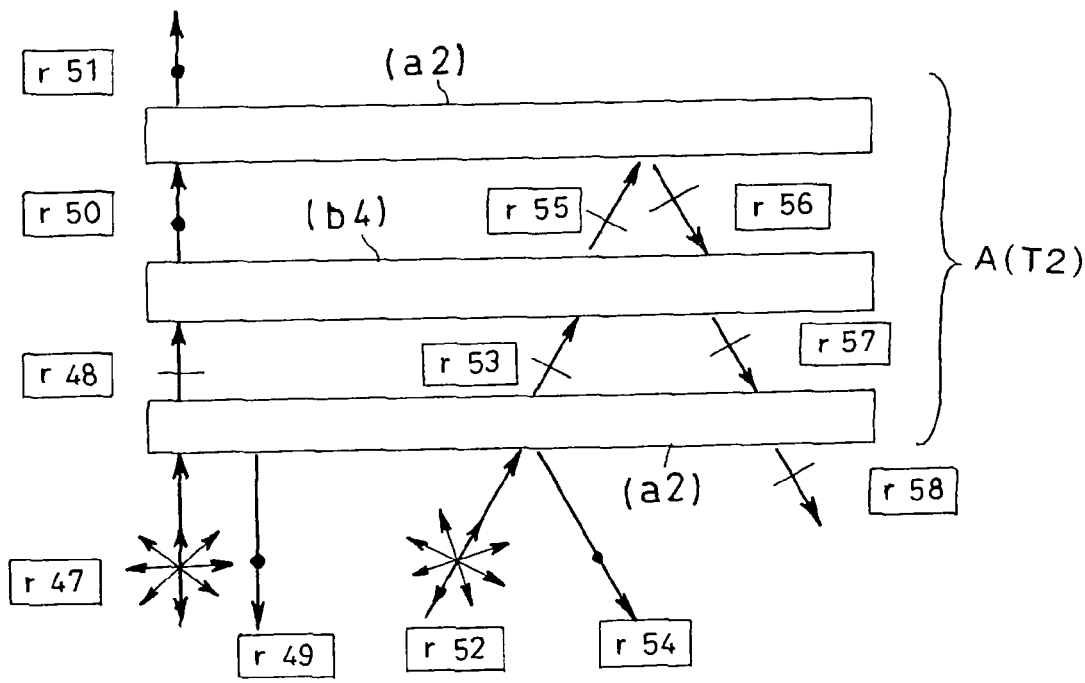

[FIG. 19]
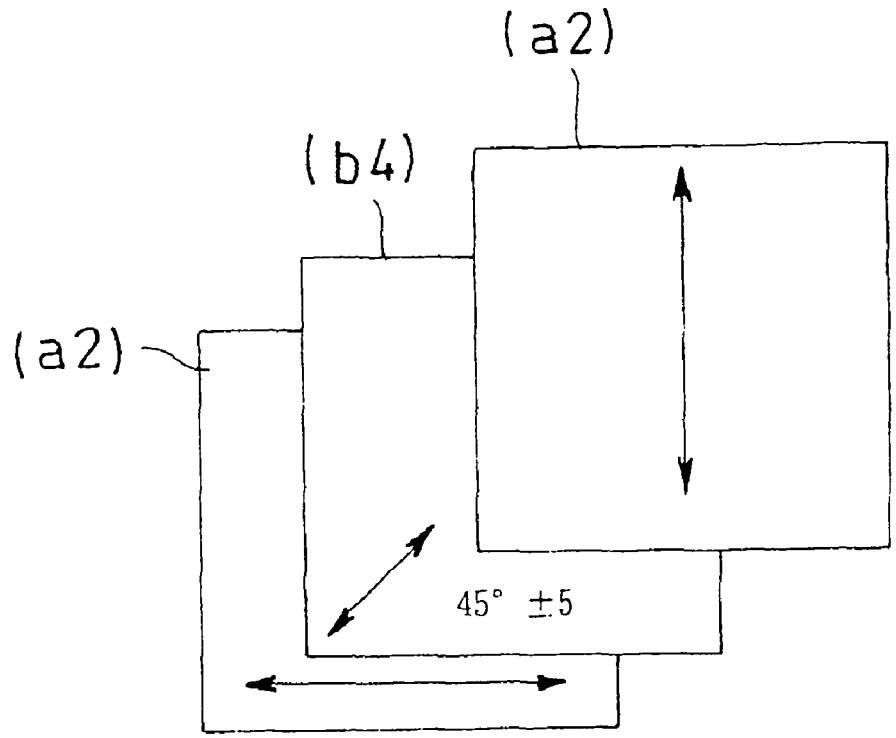
[FIG. 20]
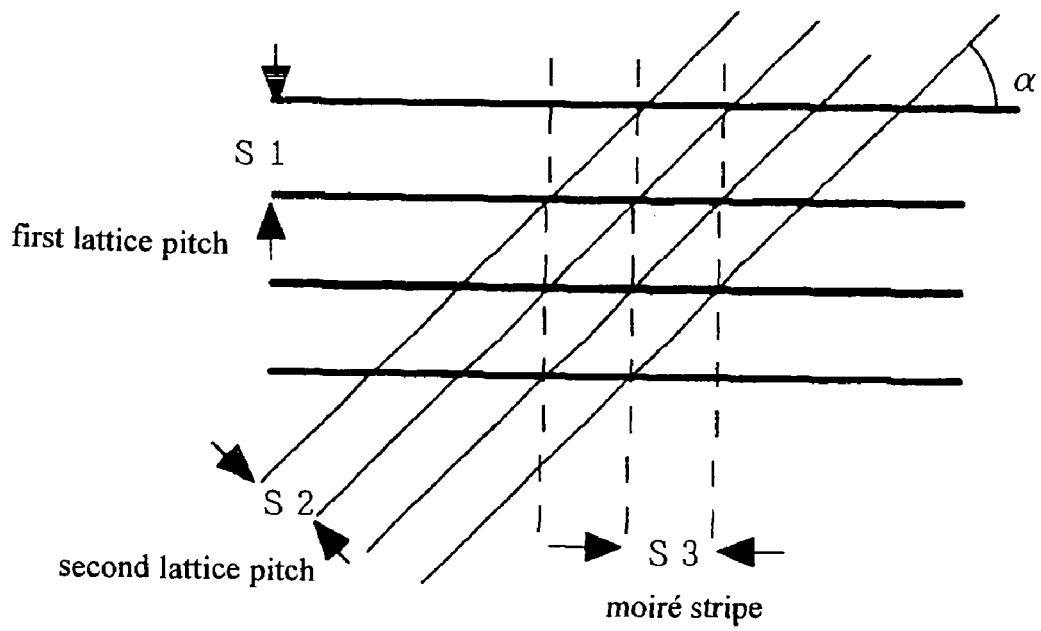

[FIG. 21]
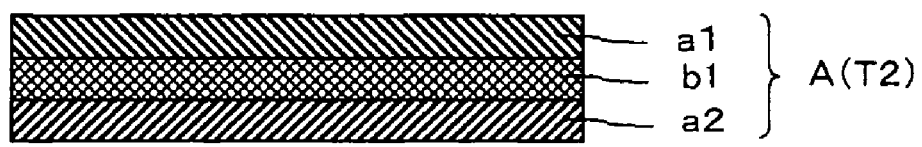
[FIG. 22]
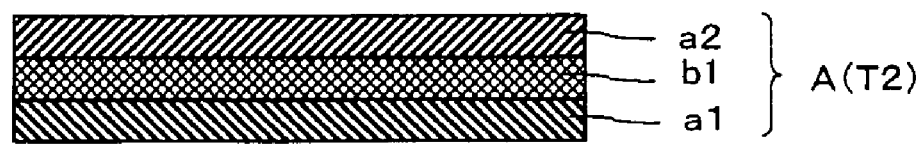
[FIG. 23]
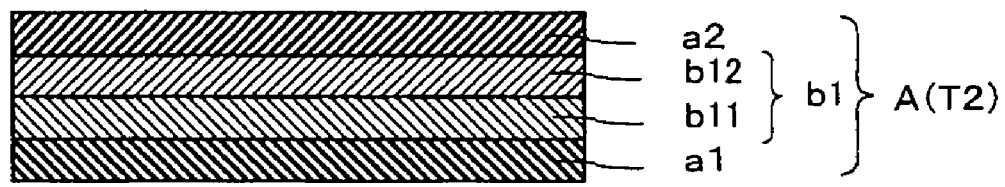
[FIG. 24]
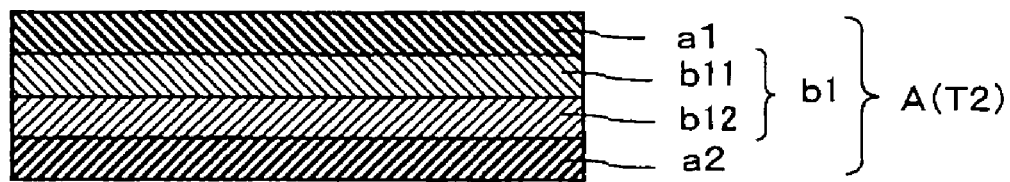

[FIG. 25]
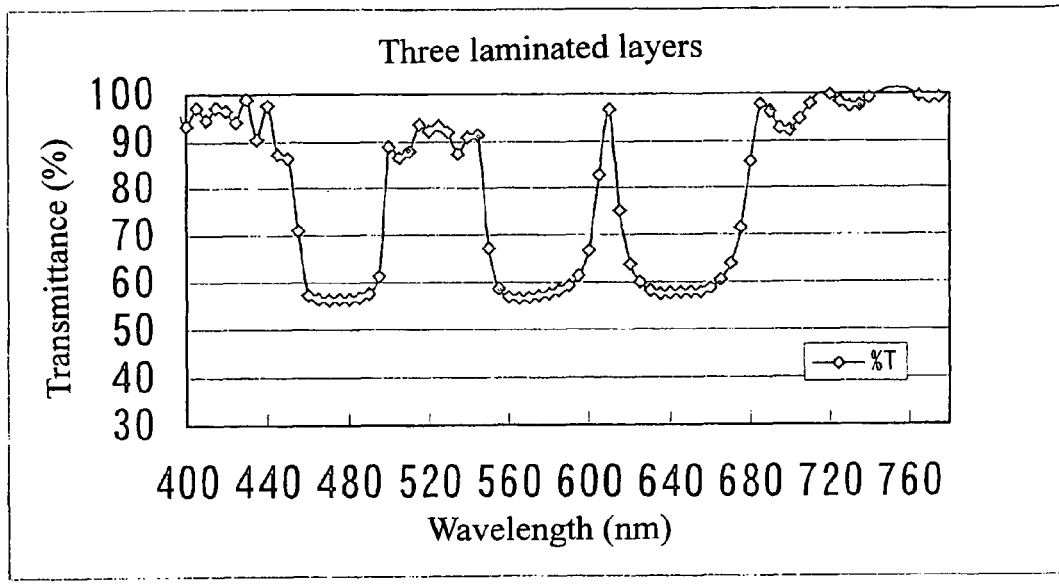
[FIG. 26]
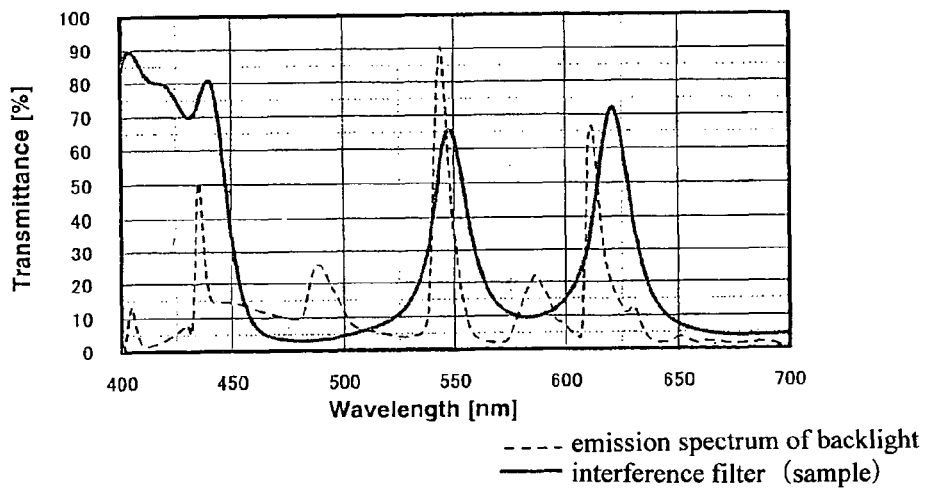
---- emission spectrum of backlight
—— interference filter (sample)

[FIG. 27]
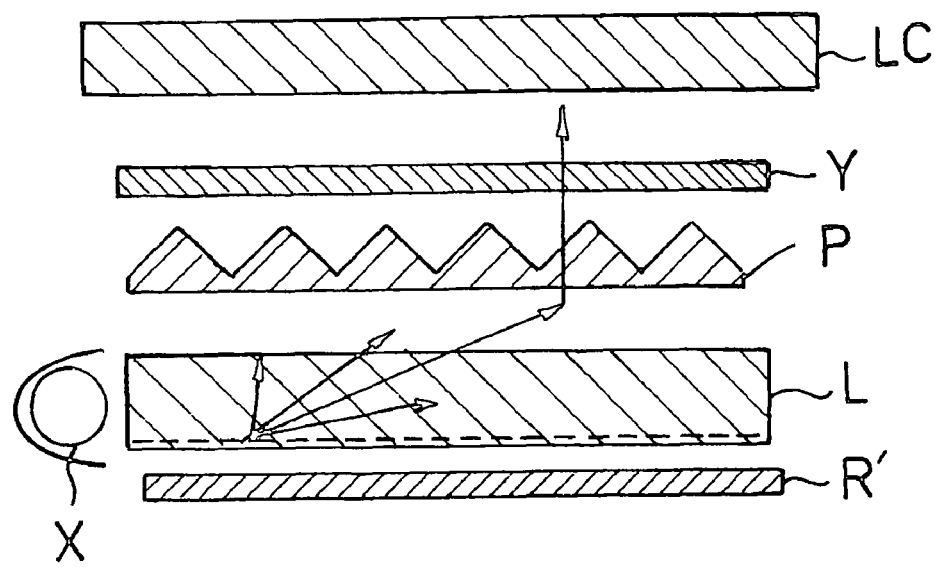
[FIG. 28]
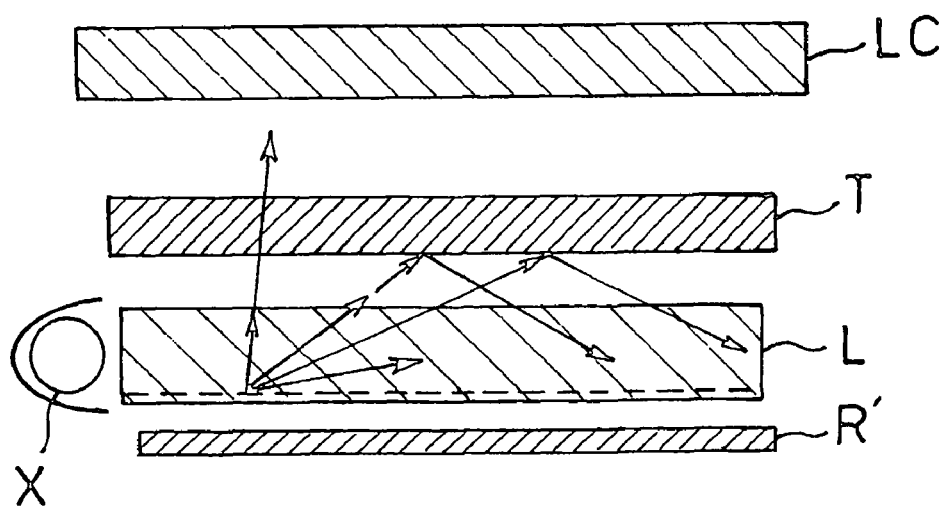

LIGHT SOURCE DEVICE AND CRYSTAL DISPLAY DEVICE

TECHNICAL FIELD

The invention relates to a light source and a liquid crystal display.

BACKGROUND ART

A mainstream light source on the market is of a design that a prism sheet (P) or the like is, as shown in FIG. 27, combined with a sidelight type light guide plate (L) having a diffuse reflection plate (R') disposed below the light guide plate to thereby increase an incident component in the front direction. In the light source of FIG. 27, a diffusing plate (Y) is disposed above the prism sheet. Generally, a light emitting angle of a sidelight type light guide plate is an angle shallow relative to the upper side or lower side and of 60° or more from the front direction and light emitting angles are, in more of cases, distributed within a range of shallow angles of 70° or more from the front direction. Since a light guide plate of this kind guides light in a resin plate using a critical angle and light is taken out in a state outside the critical condition, lights emitting at a shallow angle in an oblique direction are predominant as compared with others. Hence, a prism sheet is generally used as a contrivance to condense light in the front direction.

Such a light source is rare in design that more of normally emitting light component is obtained, for an essential reason originating from the structure as described above. A manufacturing cost has been, in more of cases, high because of its structure. A combination of a light guide plate and a prism sheet generally available in the market renders the prism sheet easily scratched and problematic in handling since the prism sheet is disposed on the upper surface side of the light guide plate. Consequently, such a light source has been exposed to a strong demand for improvement on handlability.

On the other hand, a technique is known that an optical layer (T) having an angle dependence of transmittance and reflectance such as a vapor deposited band pass filter using a Brewster angle and a layer of a cholesteric liquid crystal using a Bragg reflection, and having a selective reflection characteristic is adopted to thereby condense a diffuse light source in the front direction. A light source using such a technique is shown in FIG. 28. Proposed as a typical example is a method in which a bright-line light source is combined with a band-pass filter (see, for example, Japanese Patent Application-LAID-OPEN Nos. 6-235900, 2-158289 and 10-321025, U.S. Pat. No. 6,307,604, DE 3836955 A and DE 4222028 A, EP 578302 A, US 2002-34009 A, WO 02/2568 A1). Proposed is a method in which a light source emitting a bright line such as CRT and electroluminescence and a band-pass filter on a display are arranged to condense and collimate light beams (see, for example, Japanese Patent Application-LAID-OPEN Nos. 2001-521643 and 2001-516066 and, US 2002-036735 A, Japanese Patent Application-LAID-OPEN No. 2002-90535 and others).

Though normally incident light can be used at a high transmittance in a case where an optical layer having an angle dependence of a transmittance and a reflectance is employed, obliquely incident light is reflected thereon and not transmitted therethrough; therefore, the obliquely incident light is returned back to the light source side. The returned back light beam is transmitted through or reflected back on a light guide plate, a scattering plate and a reflection plate and then, again returned back to the emitting side, during which absorption loss is not small because of repetition of reflection and others. A liquid display using a reflection polarizer as a light source, which has been generally used, can be theoretically expected to have two hold brightness, but an actual brightness is limited to a value on the order of 1.5-hold and the balance is wasted as an absorption loss, which naturally cannot be used.

In order to enhance a recycling efficiency, an idea comes to mind that light from a light source is returned to the light emitting side by decreasing a chance of a loss due to reflection, scattering and transmission to the lowest possible level and selecting the shortest possible optical path. For example, if a light guide plate rich in normally emitting light component is adopted as a light guide plate combined with the transmittance angle dependent layer, a utilization efficiency of emitting light is improved. In a transmittance angle dependent layer, however, no consideration is given to an optical path of a reflecting light component to be recycled and as the number of times of repetitive reflections increases, emitting light from a light source makes useless stray light, which naturally results in absorption loss without being used. Besides, a light guide plate combined with a prism sheet has had the problem. Hence, options for a light guide plate combined with a transmittance angle dependent layer have been extremely limited.

DISCLOSURE OF INVENTION

The invention is directed to a light source in which a light transmittance angle dependent layer is applied to a sidelight type backlight light guide plate and it is an object of the invention to provide a light source less in absorption loss due to repetition of light reflection and the like.

It is another object of the invention to provide a liquid crystal display using the light source.

The inventors have conducted serious studies in order to solve the problems with a resultant discovery of the following light source, which has lead to completion of the invention. That is, the invention is as follows.

1. A light source comprising sidelight type backlight light guide plate (L), wherein a transmittance angle dependent layer (T1) which transmits normally incident light and reflects obliquely incident light is disposed on one surface of the sidelight type backlight light guide plate (L), and a reflection plate (R) having a repetitive slope structure is disposed on the other surface of the sidelight type backlight light guide plate (L).

2. The light source according to the above described 1, wherein the transmittance angle dependent layer (T1) is a near infrared reflection filter.

3. The light source according to the above described 1, wherein the transmittance angle dependent layer (T1) is a band-pass filter.

4. The light source according to the above described 3, wherein the band-pass filter corresponds to a bright-line spectrum of the light source.

5. The light source according to any of the above described 2 to 4, wherein the transmittance angle dependent layer (T1) is a vapor deposited multilayer thin film one layer of which is different in refractive index from another.

6. The light source according to any of the above described 2 to 4, wherein the transmittance angle dependent layer (T1) is a multi-thin layer laminate made of resin materials one material of which is different in refractive index from another.

7. The light source according to any of the above described 2 to 4, wherein the transmittance angle dependent layer (T1)

is a stretched multilayer laminate made of resin materials one material of which is different in refractive index from another.

8. A light source comprising a sidelight type backlight light guide plate (L), wherein a transmittance angle dependent polarizing layer (T2) which transmits a polarized light component of one direction of polarization in normal incident light, and selectively reflects the other polarized light component and reflects obliquely incident light regardless of a direction of polarization is disposed on one surface of the sidelight type backlight light guide plate (L), and a reflection plate (R) having a repetitive slope structure is disposed on the other surface of the sidelight type backlight light guide plate (L).

9. The light source according to the above described 8, wherein the transmittance angle dependent polarizing layer (T2) transmits a circularly polarized light, while selectively reflects a reverse circularly polarized light.

10. The light source according to the above described 9, wherein the transmittance angle dependent polarizing layer (T2) comprises at least one cholesteric liquid crystal polymer layer.

11. The light source according to the above described 10, wherein the transmittance angle dependent polarizing layer (T2) is a cholesteric liquid crystal band-pass filter.

12. The light source according to the above described 8, wherein the transmittance angle dependent polarizing layer (T2) transmits one of linearly polarized lights perpendicular to each other, while selectively reflecting the other thereof.

13. The light source according to the above described 12, wherein the transmittance angle dependent polarizing layer (T2) is a multilayer laminate made of polymers having a birefringent anisotropy.

14. The light source according to the above described 8, wherein the transmittance angle dependent polarizing layer (T2) is a polarizing element (A) in which a retardation layer (b) is inserted between at least two reflection polarizers (a) having wavelength bands, overlapped one on the other, of selective reflection of polarized light.

15. The light source according to the above described 14, wherein the reflection polarizer (a) is a circular polarization type reflection polarizer (a1) transmitting circularly polarized light, while selectively reflecting reverse circularly polarized light, and the retardation layer (b) comprises a layer (b1) having a front retardation (in the normal direction) of almost zero and a retardation of $\lambda/8$ or more relative to incident light incoming at a direction inclined from the normal direction by 30° or more.

16. The light source according to the above described 14, wherein the reflection polarizer (a) is a linear polarization type reflection polarizer (a2) transmitting one of linearly polarized lights perpendicular to each other, while selectively reflecting the other thereof, the retardation layer (b) comprises a layer (b1) having a front retardation (in the normal direction) of almost zero and a retardation of $\lambda/4$ or more relative to incident light incoming at a direction inclined from the normal direction by 30° or more, layers (b2) each having a front retardation of about $\lambda/4$ disposed on both sides of the layer (b1), one of the layers (b2) being disposed between the retardation layer (b1) and a corresponding linear polarization type reflection polarizer (a2) and the other of the layers (b2) being disposed between the retardation layer (b1) and another linear polarization type reflection polarizer (a2), the layer (b2) on the incidence side is arranged at an angle of 45° (−45°)±5° relative to the polarization axis of the linear polarization type reflection polarizer (a2) on the incidence side, the layer (b2) on the emission side is arranged at an angle of −45° (+45°)±5° relative to the polarization axis of the linear polarization type reflection polarizer (a2) on the emission side, and the layer (b2) on the incidence side and the layer (b2) on the emission side are arranged at an arbitrary angle formed between the respective slow axes thereof.

17. The light source according to the above described 14, wherein the reflection polarizer (a) is a linear polarization type reflection polarizer (a2) transmitting one of linearly polarized lights perpendicular to each other, while selectively reflecting the other thereof, the retardation layer (b) comprises two biaxial retardation layers (b3) each having a front retardation (in the normal direction) of about $\lambda/4$ and an Nz coefficient of 2 or more, the slow axis direction of the layer (b3) on the incidence side is arranged at an angle of 45° (−45°)±5° relative to the polarization axis of the linear polarization type reflection polarizer (a2) on the incidence side, the slow axis direction of the layer (b3) on the emission side is arranged at an angle of −45° (+45°)±5° relative to the polarization axis of the linear polarization type reflection polarizer (a2) on the emission side, and the layer (b3) on the incidence side and the layer (b3) on the emission side are arranged at an arbitrary angle formed between the respective slow axes thereof.

18. The light source according to the above described 14, wherein the reflection polarizer (a) is a linear polarization type reflection polarizers (a2) transmitting one of linearly polarized lights perpendicular to each other, while selectively reflecting the other thereof, the retardation layer (b) comprises one biaxial retardation layer (b4) having a front retardation (in the normal direction) of about $\lambda/2$ and an Nz coefficient of 1.5 or more, the slow axis direction of the layer on the incidence side is arranged at an angle of 45° (−45°)±5° relative to the polarization axis of the linear polarization type reflection polarizer (a2) on the incidence side, the slow axis direction of the layer on the emission side is arranged at an angle of −45° (+45°)±5° relative to the polarization axis of the linear polarization type reflection polarizer (a2) on the emission side, and the polarization axes of the two linear polarization type reflection polarizers (a2) are almost perpendicular to each other.

19. The light source according to the above described 14, wherein at least one reflection polarizer (a) is a circular polarization type reflection polarizer (a1) transmitting circularly polarized light, while selectively reflecting reverse circularly polarized light, at least one reflection polarizer (a) is a linear polarization type reflection polarizer (a2) transmitting one of linearly polarized lights perpendicular to each other, while selectively reflecting the other thereof, and the retardation layer (b) is a layer (b1) having a front retardation (in the normal direction) of almost $\lambda/4$ and a retardation of λ/8 or more for incident light incoming at a direction inclined from the normal direction by 30° or more.

20. The light source according to any of the above described 8 to 19, wherein an optical layer (D) having a function to cancel polarization of light reflected by the transmittance angle dependent polarizing layer (T2) is disposed between the transmittance angle dependent polarizing layer (T2) and the sidelight type backlight light guide plate (L) and/or between the sidelight type backlight plate (L) and the reflection plate (R).

21. The light source according to the above described 20, wherein the optical layer (D) having polarization canceling ability is placed on a surface of the repetitive slope structure of the reflection plate (R).

22. The light source according to the above described 20 or 21, wherein the optical layer (D) having polarization canceling ability is a retardation plate.

23. The light source according to any of the above described 1 to 22, wherein an average slope angle $\theta_2$ of the repetitive slope structure of the reflection plate (R) disposed on one surface of the sidelight type backlight light guide plate (L) has the following relation relative to a peak angle $\theta_1$ in an emitting light direction of the sidelight type light guide plate (L):

$\theta_2=(\theta_1/2)\pm10°$.

24. A transmission type liquid crystal display at least comprising: the light source according to any of the above described 1 to 23; a liquid crystal cell; and a polarizing plate disposed on both sides of the liquid crystal cell.

In a case where, as shown in FIG. 28, a transmittance angle dependent layer (T) having a high transmissibility in the normal incidence direction and a high reflectance characteristic in an oblique direction is combined with a sidelight type light guide plate, which has been conventionally used, which is non-expensive, and which is high in emitting light quantity in an oblique direction, all incident light beams in an oblique direction are reflected on a transmittance angle dependent layer (T) and all emitting light in an oblique direction from the upper surface side of the light guide plate (L) is returned to the light guide plate (L) side. Since a light beam emitted on the lower surface side and a reflected light beam from the transmittance angle dependent layer (T) have angles which are almost equal to each other, almost all emitting light from the light guide plate (L) may be regarded to emit at a shallow angle in a downwardly oblique direction.

Therefore, in the invention, a reflection plate (R) has a repetitive slope structure disposed, as shown in FIG. 1, below the lower side of a sidelight type backlight light guide plate (L) and designed so that a light beam having been emitted to the lower surface side of the light guide plate (L) and reflected on the reflection plate (R) is launched to the transmittance angle dependent layer (T1) in the normal incidence direction. A light beam reflected on the reflection plate (R) having the repetitive slope structure is transmitted through the transmittance angle dependent layer (T1) and then condensed without repeating reflection many times. In FIG. 1, there is shown, with an arrow mark, only a light transmitted through the transmittance angle dependent layer (T1) after being reflected by the transmittance angle dependent layer (T1).

If an emitting angle of emitting light from the light source is indicated with $\theta_1$ and an average slope angle $\theta_2$ of the reflection plate (R) disposed below the lower surface side of the light guide plate (L) is designed so that $\theta_2=\theta_1/2$, it is understood that the reflecting light are all reflected to the transmittance angle dependent layer (T1) in the front direction. Since the light beam is of normal incidence, the light beam is transmitted through the transmittance angle dependent layer (T1) to thereby enable only the front direction to be brightened.

A light source of the invention in which, as described above, the transmittance angle dependent layer (T1) is applied to the sidelight type backlight light guide plate (L) and the reflection plate (R) with the repetitive slope structure is used for reflecting light or the like can be obtained as a bright light source low in cost and high in product yield without any more of working on a sidelight type light guide plate of a dot printed type or an embossed type, which has been widely put into practical use.

The reflection plate (R) having the repetitive slope structure is hard to cause a problem such as scratch or the like to suffer in handling because of being located at the lowest surface of the optical system. Since the reflection plate (R) is located below the embossed or dot printed light guide plate (L), it is characterized that a scratch or a defect on a surface is hard to draw attention. Since no prism structure high in regularity is provided on the side thereof closer to a liquid crystal cell, no necessity arises for a light diffusion plate, which has been conventionally inserted between a prism sheet and a liquid crystal display for prevention of a moiré, and which is of a high haze and large in absorption loss to be used, and instead a light diffusion plate low in haze and low in absorption loss is sufficiently used. The construction is highly useful in both aspects of cost and brightness.

In a case where a transmittance angle dependent polarizing layer (T2) with a high polarization degree of transmitted light is used instead of the transmittance angle dependent layer (T1) (FIG. 8), about 50% of normal incident light is reflected back to the reflection plate (R) side. In this case, reflected light again passes through the original path and the reflected light as a transmitted light is further reflected on the reflection plate (R), thereafter impinges on the transmittance angle dependent polarizing layer (T2) in an oblique direction, and again reflected back to the reflection plate (R).

In FIG. 8, there is shown, with an arrow mark, only a light beam transmitted through the transmittance angle dependent polarizing layer (T2) after being reflected on the transmittance angle dependent polarizing layer (T2).

(1) indicates obliquely emitting light directed to the upper surface side of the light guide plate (L) from the light source.

(2) indicates emitting light directed to the lower surface side of the light guide plate (L) which is reflected light of the obliquely emitting light (1) on the transmittance angle dependent polarizing layer (T2). Alternatively, (2) indicates obliquely emitting light directed to the lower surface side of the light guide plate (L) from the light source.

(3) indicates transmitted light, obtained by causing the emitting light (2) to be reflected on the reflection plate (R) having the repetitive slope structure in the front direction and to be then transmitted through the transmittance angle dependent polarizing layer (T2).

(4) indicates reflected light reflected on the transmittance angle dependent polarizing layer (T2).

(5) indicates reflected light obtained by causing the reflected light (4) to be reflected on the reflection plate (R) in an oblique direction.

(6) indicates reflected light obtained by causing the reflected light (5) to be reflected on the transmittance angle dependent polarizing layer (T2).

(7) indicates reflected light obtained by causing the reflected light (6) to be reflected on the reflection plate (R) in the front direction and the reflected light is transmitted through the transmittance angle dependent polarizing layer (T2).

Light obtained by causing obliquely emitting light from the light source to be reflected on the transmittance angle dependent polarizing layer (T2) is again returned back to the front direction and can impinge on the transmittance angle dependent polarizing layer (T2) in the normal direction thereof, wherein there exist the following two ways of polarization states conceivable on the optical path.

(In a Case of Linearly Polarized Light)

In a case where linearly polarized light is reflected on the transmittance angle dependent polarizing layer (T2), a polarization axis direction of the reflected light is basically held if the reflection plate (R) is a common metal plate. Hence, much of light components sustains the original polarization axis in a reflection direction when reflected light reaches the transmittance angle dependent polarizing layer (T2) again even after repetition of reflection. Therefore, a reflected polarized light cannot be transmitted through the transmittance angle dependent polarizing layer (T2). Accordingly, it is understood that recycling is not effected. In FIG. 9(a), there is shown the behavior of linearly polarized light. In FIG. 9(a), (1) and (2) indicate natural light, (3) indicates linearly polarized light and (4), (5), (6) and (7) are linearly polarized light in a direction perpendicular to the polarization direction of the linearly polarized light. That is, it is understood that the linearly polarized light (7) cannot be transmitted through the transmittance angle dependent polarizing layer (T2).

(In a Case of Circularly Polarized Light)

In a case where a circularly polarized light is reflected on the transmittance angle dependent polarizing layer (T2), wherein a selective reflection characteristic of a cholesteric liquid crystal is in more of the cases used, a circularly polarized light is converted to a reverse circularly polarized light if a reflection plate is of a common metal reflecting surface. On the other hand, it has been known that in a case where reflection occurs on a cholesteric liquid crystal layer, no sense of rotation of a circularly polarized light is altered. Therefore, in a case of an optical path of the invention, a circularly polarized light is restored to a circularly polarized light in the reflection direction when a circularly polarized light impinges normally on the transmittance angle dependent polarizing layer (T2), so that the circularly polarized light cannot be transmitted through the transmittance angle dependent polarizing layer (T2). Accordingly, it is understood that recycling is not effected. In FIG. 9(b), there is shown the behavior of circularly polarized light in this case. In FIG. 9(b), (1) and (2) indicate natural light, (3) is a circularly polarized light, (4) and (7) are reverse circularly polarized light relative to (3), and (5) and (6) are circularly polarized light with the same sense of rotation as (3). That is, it is understood that the circularly polarized light (7) cannot be transmitted through the transmittance angle dependent polarizing layer (T2).

Therefore, in a case where the transmittance angle dependent polarizing layer (T2) is used as described above, optical layers (D) having a function to cancel polarization of light reflected on the transmittance angle dependent polarizing layer (T2) are preferably inserted between the transmittance angle dependent polarizing layer (T2) and the sidelight type backlight light guide plate (L) and/or between the sidelight type backlight light guide plate (L) and the reflection plate (R). In a case where the optical layer (D) having the polarization canceling ability is disposed between the sidelight type backlight light guide plate (L) and the reflection plate (R), the optical layer (D) can also be placed on a surface of the repetition slope structure of the reflection plate (R).

In FIG. 10(a), there is shown a case where the optical layer (D) having a polarization canceling ability is disposed between the transmittance angle dependent polarizing layer (T2) and the sidelight type backlight light guide plate (L). In FIG. 10(b), there is shown a case where the optical layer (D) having a polarization canceling ability is disposed between the sidelight type backlight light guide plate (L) and the reflection plate (R). In FIG. 10(c), there is shown an example case where the optical layer (D) having a polarization canceling ability is formed on the surface of the repetitive slope structure of the reflection plate (R). With the optical layer (D) having a polarization canceling ability assembled as part, even in a case where the transmittance angle dependent polarizing layer (T2) is used, a light utilization efficiency increases and inconveniences such as absorption loss or generation of stray light in a direction in which the light cannot be used are substantially eliminated, thereby enabling a bright light source high in efficiency to be manufactured at a low cost.

BRIEF DESCRIPTION OF DRAWINGS

FIG. 1 is an example of a sectional view of a light source of the invention and transmission and reflection of light beams therein;

FIG. 2 is an example of a sectional view of a repetitive slope structure of a reflection plate of the invention;

FIG. 3 is an example of a sectional view of a repetitive slope structure of a reflection plate of the invention;

FIG. 4 is an example of a repetitive slope structure of a reflection plate of the invention;

FIG. 5 is an example of a repetitive slope structure of a reflection plate of the invention;

FIG. 6 is an example of a sectional view of a repetitive slope structure of a reflection plate of the invention;

FIG. 7 is an example of a sectional view of a repetitive slope structure of a reflection plate of the invention;

FIG. 8 is an example of a sectional view of a light source of the invention and transmission and reflection of light beams therein;

FIG. 9 is an example of a transmission and reflection of polarized light beams in the light source of FIG. 8;

FIG. 10 is an example of a sectional view in a case where an optical layer (D) is disposed in a light source of the invention;

FIG. 11 is a conceptual representation showing an example of a fundamental principle of collimation of light beams of a polarizing element (A);

FIG. 12 is description of states of light beams shown in FIGS. 1, 3, 4, 6 and 8;

FIG. 13 is a conceptual diagram showing conversion of linearly polarized light to circularly polarized light;

FIG. 14 is a conceptual representation showing an example of a fundamental principle of collimation of light beams of a polarizing element (A);

FIG. 15 is an example showing placement angles of layers in collimation of light beams using a linear polarization type reflection polarizer (a2);

FIG. 16 is a conceptual representation showing an example of a fundamental principle of collimation of light beams of a polarizing element (A);

FIG. 17 is an example showing placement angles of layers in collimation of light beams using a linear polarization type reflection polarizer (a2);

FIG. 18 is a conceptual representation showing an example of a fundamental principle of collimation of light beams of a polarizing element (A);

FIG. 19 is an example showing placement angles of layers in collimation of light beams using a linear polarization type reflection polarizer (a2);

FIG. 20 is a conceptual representation of showing a direct solution of moiré;

FIG. 21 is an example of a sectional view of a polarizing element (A);

FIG. 22 is an example of a sectional view of a polarizing element (A);

FIG. 23 is an example of a sectional view of a polarizing element (A);

FIG. 24 is an example of a sectional view of a polarizing element (A);

FIG. 25 is a graph showing a wavelength characteristic of a band-pass filter in example 3;

FIG. 26 is a graph showing a wavelength characteristic of a band-pass filter in example 4;

FIG. 27 is an example of a sectional view of a conventional light source and transmission and reflection of light beams therein; and FIG. 28 is an example of a sectional view of a conventional light source and transmission and reflection of light beams therein.

BEST MODE FOR CARRYING OUT THE INVENTION

Description will be given of a light source of the invention below with reference to the accompanying drawings.

In FIG. 1, there is shown a schematic view of a light source in which a transmittance angle dependent layer (T1) through which normally incident light is transmitted and on which an obliquely incident light beam is reflected is disposed on the liquid crystal cell (LC) side of a sidelight type backlight light guide plate (L), while a reflection plate (R) having a repetitive slope structure is disposed on the other side of the sidelight type backlight light guide plate (L) from the liquid crystal cell (LC). The reflection plate (R) is disposed so that the repetitive slope structure side faces the sidelight type backlight light guide plate (L). A cold cathode tube (X) is provided to the sidelight type backlight light guide plate (L).

(Sidelight Type Backlight Light Guide Plate (L))

A side light type backlight light guide plate (L), which has been conventionally employed, can be used without a specific limitation imposed thereon and a sidelight type light guide plate of a dot printed type or an embossed type as is can be used. A wedge type light guide plate can be used as a backlight light guide plate.

(Transmittance Angle Dependent Layer (T1))

Normally incident light is transmitted through and obliquely incident light is reflected on the transmittance angle dependent layer (T1). A near-infrared reflection filter, a band-pass filter and an interference filter can be exemplified as the transmittance angle dependent layer (T1). A band-pass filter employed as a transmittance angle dependent layer (T1) is preferably used in combination with a light source having a bright-line spectrum. Concrete examples of the transmittance angle dependent layers (T1) include: a vapor deposited multilayer thin film one layer of which is different in refractive index from another, a multi-thin layer laminate made of resin materials one material of which is different in refractive index from another and a stretched multilayer laminate made of resin materials one material of which is different in refractive index from another.

(Reflection Plate)

The reflection plate has the repetitive slope structure. The reflection plate (R) is disposed so that the repetitive slope structure faces the sidelight type backlight light guide plate (L) side.

The slope structure of a reflection plate (R) is preferably designed so that an average slope angle ($\theta_2$) has a value $\theta_2 = \theta_1/2$ or a value in the vicinity of $\theta_2 = \theta_1/2$ relative to a peak angle ($\theta_1$) in an emitting direction from the light source. This is because that with an average slope angle ($\theta_2$) farther from the equation, an incidence angle of a recycled light beam relative to a light guide plate is shifted away from the normal direction, thereby reducing a transmittance through an optical element having a transmittance angle dependence.

It is an effective means, however, to distribute an average slope angle ($\theta_2$) in some spread in order to eliminate moiré or brightness irregularity from emitting light of an optical element having transmittance angle dependence. An angle distribution shape in this case may be changed for each slope, or alternatively a slope angle distribution structure may be set on a slope itself by rendering the surface of the slope concave or convex. In this case, it is preferable that an average slope angle $\theta_2 = (\theta_1/2) \pm 10°$. In this case, it is more preferably that an average slope angle $\theta_2 = (\theta_1/2) \pm 5°$.

There arise cases where an emitting angle ($\theta_1$) at a site changes according to a difference in distance of the site from a light source, which depends on a design of a light guide plate. In this case, though a slope angle is, to be exact, desirably set so as to be adapted for $\theta_1$ at each site to thereby design a reflection plate having a slope angle different according to a distance from a light source side, an average value of the maximum value and minimum value of $\theta_1$ can be used at slopes instead.

An average slope angle ($\theta_2$) is measured with a stylus surface roughness meter (TALISURF, Tailor Hobson Co.). With this meter adopted, an average slope angle ($\theta_2$) can be measured even in a case of a structure as shown in FIG. 3 or 5. Note that in a case of a structure as shown in FIG. 6, a smaller angle is ($\theta_2$). An emitting angle ($\theta_1$) is measured by Ez contrast manufactured by ELDIM Co.

A repetitive slope structure may have either a flat slope surface as shown in FIG. 2 or a curved slope surface as shown in FIG. 3. Moreover, a repetitive slope structure may have either a line structure as shown in FIG. 4 or a microprism dot array arrangement as shown in FIG. 5. Still moreover, a repetitive slope structure may have either a structure of a symmetrical type or a structure of an asymmetrical type as shown in FIG. 6. Besides, if a backlight light guide plate is a wedge type light guide plate, a case arises where an emitting angle of emitting light in the vicinity of a light source is different from an emitting angle thereof on the side far from the light source. In such a case, an angle of a repetitive slope structure on the side in the vicinity of a light source may be, as shown in FIG. 7, different from an angle thereof on the side far from the light source to thereby, optimize a slope angle relative to an emitting angle ($\theta_1$) or alternatively, the average value of both angles at sites close to or far from the light source may be used as approximation.

A repetitive slope structure of a reflection plate (R) can be obtained, for example, in a way such that a mold with a desired repetitive slope structure is fabricated and then the structure is transferred to a molded product. The mold is manufactured by conducting precise cutting on a brass mold. Transfer methods include: a method in which an ultraviolet curable resin or the like is coated on the mold and then the coat is irradiated with ultraviolet radiation and cured to thereby obtain a transferred product, a method in which a thermosetting resin is coated on the mold to then heat cure the coat and to thereby, obtain a transferred product, a method in which a thermoplastic resin is cast to thereby transfer a mold shape to the resin, and a method in which a resin dissolved into a solvent is coated on the mold to then dry the wet coat and to thereby transfer the shape to a product. Moreover, a repetitive slope structure was formed on a metal roll to thereby transfer the structure onto a surface of a film substrate by embossment. Still moreover, a repetitive slope structure can be cut directly on a resin substrate. Besides, a repetitive slope structure can be fabricated in a procedure that a photo-curable resin such as a resist is coated on a substrate to expose the resist with a mask having a repetitive slope structure in which a transmittance continuously changes, to develop the exposed resist and to thereby enable the structure to be directly fabricated.

In FIG. 8, there is shown a schematic view of a light source in which disposed on the liquid crystal (LC) side of a sidelight type backlight light guide plate (L) is a transmittance angle dependent polarizing layer (T2), through which one component of normally incident polarized light is transmitted, on which the other component thereof is selectively reflected and on which obliquely incident light is reflected regardless of the polarization direction thereof, and disposed on the other side of the sidelight type backlight guide plate (L) is a reflection plate (R) having a repetitive slope structure. FIG. 8 omits a liquid crystal cell (LC). The sidelight type backlight light guide plate (L) and the reflection plate (R) having a repetitive slope structure can be ones similar to those as described above. The transmittance angle dependent polarizing layer (T2) can be exemplified as follows:

Transmittance angle dependent polarizing layers (T2) include: a type in a polarization state through which a circularly polarized light is transmitted and on which a reverse circularly polarized is selectively reflected, and a type in a polarization state through which one of linearly polarized lights perpendicular to each other is transmitted and on which the other polarized light is selectively reflected. At least one layer of a cholesteric liquid crystal polymer in use is exemplified as a circular polarization type transmittance angle dependent polarizing layer (T2). The cholesteric liquid crystal polymer layer in use can be a cholesteric liquid crystal band-pass filter obtained by laminating two or more layers. A band-pass type filter is preferably combined with a light source having a bright-line spectrum. On the other hand, a multilayer laminate having birefringent anisotropy in use can be a linear polarization type transmittance angle dependent polarizing layer (T2).

A transmittance angle dependent polarizing layer (T2) in use can be a polarizing element (A) in which a retardation layer (b) is inserted between at least two reflection polarizer (a) having wavelength bands, overlapped one on the other, of selective reflection of polarized light. A polarizing element (A) also has a circular polarization type and a linear polarization type. Description will be given of a polarizing element (A). Description will be given of the invention using an ideal model below so as to clarify a mechanism for simultaneous achievement of improvement on light condensation and brightness.

FIG. 11 is a descriptive representation showing a principle in a case where a circular polarization type reflection polarizer (a1) is used as a reflection polarizer (a). In FIG. 11, as a polarization element (A), a circular polarization type reflection polarizer (a1), a retardation layer (b1) and a circular polarization type reflection polarizer (a1) are disposed in the order starting at the backlight side (the lower side).

A working principle is as described in the steps 1) to 3):

1) With the circular polarization type reflection polarizer (a1) separating a polarized light by reflection, incident light is divided into transmitted light and reflected light by a rotational sense of polarization of incident light. Therefore, no absorption loss occurs.

2) With a special retardation plate (b1) having a front retardation of almost zero and a retardation in an oblique direction of a value, front incident light passes as is.

3) Incident light in an oblique direction is not absorbed and returned back as reflected light. The reflected light is repeatedly reflected till the light is converted to a transmitted light.

The retardation plate (b1) is generally referred to as a negative C-plate (negative retardation plate) or a positive C-plate (positive retardation plate). The retardation plates (b1) have properties that in the vertical direction (the normal direction), a retardation is close to zero, while when being inclined, a retardation occurs. As typical negative C-plates, exemplified are to be concrete: a biaxially stretched polycarbonate film and polyethylene terephthalate film, a film made of a cholesteric liquid crystal, and having a selective reflection wavelength band set to be shorter than visible light, a film made of a discotic liquid crystal aligned in parallel to a plane and a film made of an inorganic crystalline compound, having a negative retardation, and obtained by in-plane alignment. As a typical positive C-plate, exemplified is, to be concrete: a liquid crystal film obtained in homeotropic alignment.

A circular polarization type reflection polarizer (a1) in use is a polarizer in which a cholesteric liquid crystal is mainly aligned and a twist pitch is adjusted and fixed (for example, a laminate of plural films having respective different selective reflection central wavelengths or a film in a single layer and having a pitch altering in the thickness direction) so that a selective reflection wavelength band covers a visible light region/a light source emission wavelength band; or the like. The circular polarization type reflection polarizers (a1) disposed on both sides of the retardation plate (b1) of FIG. 11 in use are preferably polarizers with the same rotational sense of transmitted circularly polarized light as each other.

Since a circular polarization type reflection polarizer (a1) and the retardation plate (b1) can be used without designating an adherence direction because of almost non-existence of axes in an in-plane direction for both. Hence, an angular range of confinement of collimation has isotropic/symmetrical characteristics.

Note that description below is given based on the figures; marks (r) are assigned as shown in FIG. 12 such that (i) indicate natural light, (ii) circularly polarized light and (iii) linearly polarized light. The circularly polarized light (ii) is divided into (ii)-1 and (ii)-2, which have respective arrow marks reverse in sense of rotation from each other. This means that senses of rotation of both circularly polarized light are reverse to each other. The (iii)-1 and (iii)-2 mean that polarization axes of both are perpendicular to each other.

Description will be given of a case where the circular polarization type reflection polarizers (a1) shown in FIG. 11 are used as a reflection polarizer (a), following changes in lights in collimation.

1) Light vertically impinging on the circular polarization type reflection polarizer (a1) included in natural light supplied from a backlight is polarization separated into transmitted light (r3) and reflected light (r2). The transmitted light and the reflected light are reverse in rotational sense of circular polarization to each other.

2) The transmitted light (r3) passes through the retardation layer (b1) as is.

3) Transmitted light (r4) further passes through the circular polarization type reflection polarizer (a1) as is.

4) Transmitted light (r5) is used in a liquid crystal display disposed thereon.

5) On the other hand, light obliquely impinging on the circular polarization type reflection polarizer (a1) included in natural light (r6) supplied from the backlight is polarization separated into transmitted light (r8) and a reflected light (r7). The transmitted light and the reflected light are reverse in rotational sense of circular polarization to each other.

6) Transmitted light (r8) is affected in retardation while passing through the retardation layer (b1). When retardation value of ½ wavelength is given, circularly polarized light changes a current rotational sense thereof to a reverse rotational sense. Hence, a rotational sense of the transmitted light (r8) is inverted after transmission of the retardation layer (b1).

7) Transmitted light (r9) is emitted with a reverse rotational sense under an influence of retardation.

8) The transmitted light (r9) with a reverse rotational sense is reflected back on the circular polarization type reflection polarizer (a1). It has been generally known that a rotational sense of a circularly polarized light is inverted when being reflected (W. A. Shurcliff, Polarized Light: Production and Use, (Harvard University Press, Cambridge, Mass., 1966). As an exception, it has been known that in a case of reflection on a cholesteric liquid crystal layer, no change in rotational sense occurs. Herein, since reflection is performed on a cholesteric liquid crystal surface, no change occurs in either of rotational senses of circular polarization of the transmitted light (r9) and the reflected light (r10).

9) The reflected light (r10) receives an influence of retardation while passing through the retardation layer (b1).

10) Transmitted light (r11) is inverted in rotational sense thereof under an influence of retardation.

11) The transmitted light (r11) returns back with the same rotational sense as the transmitted light (r8) because of inversion of a rotational sense passes through the circular polarization type reflection polarizer (a1) as is.

12) Reflected light (r2, r7 and r12) returns back to the backlight side and recycled. These returned light is repeatedly reflected till the light changes propagation directions and a rotational sense of polarization at random by a diffusion plate and others disposed in the backlight and thereby converted to light that can again transmit in the vicinity of the normal direction to a polarizer (A), thereby contributing to brightness enhancement.

13) Since the transmitted circularly polarized light (r5) can be converted to linearly polarized light by disposing a λ/4 plate, the light can be used in a liquid crystal display without causing absorption loss.

In connection with a transmittance and reflectance of the circular polarization type reflection polarizer (a1) using a cholesteric liquid crystal, a wavelength characteristic of a transmitted light shifts to the short wavelength side relative to incident light in an oblique direction. Therefore, in order to function sufficiently on incident light at a deep angle, a necessity arises that a sufficient polarization characteristic/retardation characteristic is ensured in the long wavelength side outside the visible light region. While the retardation layer (b1) used in this system, ideally and theoretically, would have only to have a retardation of ½ wavelength, to be exact, in an oblique direction, a circular polarization type reflection polarizer (a1: a cholesteric liquid crystal layer) actually used has a property as a negative retardation plate to some extent. Hence, the retardation layer (b1) can exert the optical function of the present invention if the layer has a retardation of ⅛ wavelength or more in an oblique direction.

In a case where the reflection polarizer (a) is a linear polarization type reflection polarizer (a2), an optical axis relative to a light incident a C-plate in an oblique direction is always perpendicular to a light direction, for example, if the C-plate (retardation layer (b1)) is used alone as a retardation layer. Hence, retardation is not produced to thereby cause no polarization conversion. Therefore, in a case where the linear polarization type reflection polarizer (a2) is employed, λ/4 plates (b2) each having the slow axis direction at an angle of 45° or −45° relative to the polarization axis of the linear polarization type reflection polarizer (a2) are disposed on both sides of the C-plate. With such a construction applied, an operation can be performed that the linearly polarized light is converted to a circularly polarized light with the λ/4 plate (b2), thereafter, the circularly polarized light is converted to an inverted circularly polarized light by a retardation of the C-plate and the circularly polarized light can be again converted to linearly polarized light with the λ/4 plate (b2).

FIG. 13 is a conceptional view showing a process in which natural light is polarization separated to a linearly polarized light with the linear polarization type reflection polarizer (a2) and further converted to circularly polarized light with the λ/4 plate (b2).

FIG. 14 is a conceptional representation in a case where a linear polarization type reflection polarizer (a2) is employed as the reflection polarizer (a). In FIG. 14, as the polarizing element (A), a linear polarization type reflection polarizer (a2), a λ/4 plate (b2), a retardation layer (b1) and a linear polarization type reflection polarizer (a2) are disposed in the order starting at the backlight side (the lower side).

FIG. 15 is an example of laminate angles of respective films in a collimation system shown in FIG. 14. A double head arrow mark shown on a linear polarization type reflection polarizer (a2) is the polarization axis and a double head arrow mark shown on the λ/4 plate (b2) is the slow axis. Two pairs of the polarization axis of a linear polarization type reflection polarizer (a2) and the slow axis of a λ/4 plate (b2) are arranged on both sides of the C-plate: the retardation layer (b1) so as to be at an angle of 45° (−45°)±5° relative to each other. The combinations are shown as set 1 and set 2, respectively. Note that an angle formed between the axes of the λ/4 plates (b2) on the incidence side and the emission side is arbitrary.

If an angle formed between a polarization axis of the linear polarization type reflection polarizer (a2) and a slow axis of the λ/4 plate (b2) is maintained at a value of 45° (−45°) relative to each other, the set 1 and the set 2 may be rotated. Since the C-plate: the retardation layer (b1) has no axis direction in a plane, the C-plate can be disposed without designation of an angle.

Description will be given, following changes in collimated lights shown in FIGS. 14 and 15.

1) Part of natural light (r14) supplied from a backlight vertically impinges on the linear polarization type reflection polarizer (a2).

2) The linear polarization type reflection polarizer (a2) transmits linearly polarized light (r15) and reflects linearly polarized light (r16) in a direction perpendicular thereto.

3) The linearly polarized light (r15) transmits the λ/4 plate (b2) and is converted to circularly polarized light (r17).

4) The circularly polarized light (r17) passes through the retardation layer (b1) as is.

5) Circularly polarized light (r18) passes through the λ/4 plate (b2) and is converted to linearly polarized light (r19).

6) The linearly polarized light (r19) passes through the linear polarization type reflection polarizer (a2) as is.

7) Linearly polarized light (r20) impinges on a liquid crystal display disposed thereon and transmitted through without a loss.

8) On the other hand, part of natural light (r21) supplied from the backlight impinges obliquely on the linear polarization type reflection polarizer (a2).

9) The linear polarization type reflection polarizer (a2) transmits a linearly polarized light (r22) and reflects linearly polarized light (r23) in a direction perpendicular thereto.

10) The linearly polarized light (r22) transmits the λ/4 plate (b2) and is converted to circularly polarized light (r24).

11) The circularly polarized light (r24) is affected of a retardation of ½ wavelength and a rotational sense thereof is inverted while passing through the retardation layer (b1).

12) Circularly polarized light (r25) with a reverse rotational sense passes through the λ/4 plate (b2) and is converted to linearly polarized light (r26).

13) The linearly polarized light (r26) is reflected back on the linear polarization type reflection polarizer (a2) and converted to linearly polarized light (r27).

14) The linearly polarized light (r27) passes through the λ/4 plate (b2) and is converted to circularly polarized light (r28).

15) The circularly polarized light (r28) is affected of a retardation of ½ wavelength and a rotational sense thereof is inverted while passing through the retardation layer (b1).

16) Circularly polarized light (r29) with a reverse rotational sense passes through the λ/4 plate (b2) and is converted to linearly polarized light (r30).

17) The linearly polarized light (r30) passes through the linear polarization type reflection polarizer (a2) as is.

18) Reflected light (r16, r23 and r31) returns back to the backlight side and recycled.

While in an ideal system, an angle between the slow axis of a λ/4 plate (b2) described herein and the polarization axis of a linear polarization type reflection polarizer (a2) theoretically in essence is 45°, characteristics of the linear polarization type reflection polarizer (a2) and the λ/4 plate (b2) in a practical case are not perfect in the visible light region and each have a subtle change according to a wavelength. If this is neglected and lamination is conducted at 45°, there arises a case where coloration occurs.

Therefore, by shifting an angle slightly to compensate a hue, optimization of the system in the entirety can be reasonably realized. On the other hand, if an angle is largely shifted, there arise other problems such as reduction in transmittance and others. Therefore, it is desirable that adjustment is actually performed within a range of the order of ±5°.

In connection with a transmittance and reflectance of the linear polarization type reflection polarizer (a2), that a wavelength characteristic of a transmitting light shifts relative to incident light in an oblique direction to the short wavelength side is the same as in the circular polarization type reflection polarizer (a1) using a cholesteric liquid crystal. Therefore, in order to function sufficiently on incident light at a deep angle, a necessity arises that a sufficient polarization characteristic/retardation characteristic is ensured in the long wavelength side outside the visible light region.

The linear polarization type reflection polarizer (a2) has a smaller negative retardation characteristic of its own as compared with that of a cholesteric liquid crystal. Therefore, a retardation in an oblique direction (an inclination of 30°) of the retardation layer (b1) used by being inserted between the linear polarization type reflection polarizers (a2) is somewhat larger than in the case of the circular polarization type reflection polarizers (a1) using a cholesteric liquid crystal and preferably ¼ wavelength or more.

In a case where the reflection polarizer (a) is the linear polarization type reflection polarizer (a2), which is different from the above described case, a similar effect can also be obtained by replacing the structure in which the C-plate: the retardation layer (b1) is sandwiched between the two λ/4 plates (b2) with two biaxial retardation layers (b3) each of which has a front retardation of about λ/4, and a retardation in the thickness direction of about λ/2 or more. Such a biaxial retardation layer (b3) with an Nz coefficient of 2 or more satisfies the above described required conditions.

FIG. 16 is a conceptional representation in a case where the linear polarization type reflection polarizers (a2) are adopted as reflection polarizers (a) and the biaxial retardation layers (b3) is employed. In FIG. 16, as a polarization element (A), a linear polarization type reflection polarizer (a2), a biaxial retardation layer (b3), a biaxial retardation layer (b3) and a linear polarization type reflection polarizer (a2) are disposed in the order starting at the backlight side (the lower side).

FIG. 17 is an example of laminate angles of films in the collimation system shown in FIG. 16. A double head arrow mark shown on a linear polarization type reflection polarizer (a2) is the polarization axis; a double head arrow shown on a retardation layer (b1) is the slow axis. The polarization axis of a linear polarization type reflection polarizer (a2) and the slow axis of a biaxial retardation layer (b3) are arranged at an angle of 45° (−45°)±5° therebetween. The combinations are indicated by set 1 and set 2, respectively.

For ease in description of optical paths, there is exemplified a case where the linear polarization type reflection polarizers (a2) disposed one above the other have the respective polarization axes parallel to each other and slow axes of the two biaxial retardation layers (b3) one on the other are perpendicular to each other. The biaxial retardation layers (b3) one on the other has the respective slow axes forming an arbitrary angle therebetween. The set 1 and set 2 may be rotated as far as an angle between the polarization axis of a linear polarization type reflection polarizer (a2) and the slow axis of a biaxial retardation layer (b3) is maintained at a value of 45° (−45°) relative to each other.

Description will be given, following changes in collimated lights shown in FIGS. 16 and 17.

1) Part of natural light (r32) supplied from a backlight impinges vertically on the linear polarization type reflection polarizer (a2).

2) The linear polarization type reflection polarizer (a2) transmits linearly polarized light (r33) and reflects linearly polarized light (r34) in a direction perpendicular to the linearly polarized light (r33).

3) The linearly polarized light (r33) transmits the two biaxial retardation layers (b3) each with a front retardation of about ¼ wavelength. Herein, since the slow axes of the two biaxial retardation layers (b3) one on the other are perpendicular to each other at 90°, the front retardation is 0. Therefore, linearly polarized light (r35) passes through as is.

4) The linearly polarized light (r35) passes through the linear polarization type reflection polarizer (a2) as is.

5) Linearly polarized light (r36) impinges on a liquid crystal display and transmitted without a loss.

6) On the other hand, part of natural light (r37) supplied from the backlight impinges obliquely on the linear polarization type reflection polarizer (a2).

7) The linear polarization type reflection polarizer (a2) transmits linearly polarized light (r38) and reflects linearly polarized light (r39) in a direction perpendicular to thereof.

8) The linearly polarized light (r38) impinges obliquely on the two biaxial retardation layers (b3). Since the two biaxial retardation layers (b3) each have a front retardation of ¼ wavelength and an Nz coefficient of 2 or more, linearly polarized light (r40) transmitted through the two biaxial retardation layers (b3) changes the polarization axis direction thereof by 90° because of a change in retardation in the thickness direction.

9) Linearly polarized light (r40) impinges on the linear polarization type reflection polarizer (a2).

10) Since the linear polarization type reflection polarizers (a2) one above the other have the polarization axes in the same direction, the linearly polarized light (r40) is reflected as a reflected light (r41).

11) The reflected light (r41) is affected of a retardation while passing through the two biaxial retardation layers (b3) in a similar way to that in the step 8) to thereby form linearly polarized light (r42) with the polarization axis direction thereof rotated by 90°.

12) The linearly polarized light (r42) passes through the linear polarization type reflection polarizer (a2) as is.

13) Reflected light (r34, r39 and r43) returns back to the backlight side and recycled.

The polarization element (A) shown in FIGS. 16 and 17 have the two biaxial retardation layers (b3), having a front retardation of about ¼ wavelength and an Nz coefficient of 2 or more, laminated one on the other each. This structure can produces almost the same characteristic as in the case employing a three layered laminate of the structure in which the C-plate: the retardation layer (b1) is sandwiched between the two λ/4 plates (b2), which is shown in FIGS. 14 and 15. Therefore, the number of laminated layers is smaller and productivity is somewhat more excellent than the above described polarization element (A).

While in an ideal system, an angle between the slow axis of a retardation plate (b3) and the polarization axis of a linear polarization type reflection polarizer (a2) described herein theoretically in essence is 45°, characteristics of the linear polarization type reflection polarizer (a2) and the retardation layer (b3) in a practical case are not perfect in the visible light region and each have a subtle change according to a wavelength. If this is neglected and lamination is conducted at 45°, there arises a case where coloration occurs.

Therefore, by shifting an angle slightly to compensate a hue, optimization of the system in the entirety can be reasonably realized. On the other hand, if an angle is largely shifted, there arises a case where other problems such as reduction in transmittance and others occur. Therefore, it is desirable that adjustment is actually performed within a range of the order of ±5°.

In connection with a transmittance and reflectance of the linear polarization type reflection polarizer (a2), that a wavelength characteristic of transmitted light shifts relative to incident light in an oblique direction to the short wavelength side is the same as the circular polarization type reflection polarizer (a1) using a cholesteric liquid crystal. Therefore, in order to function sufficiently on incident light at a deep angle, a necessity arises that a sufficient polarization characteristic/retardation characteristic is ensured in the long wavelength side outside the visible light region.

In a case where a reflection polarizer (a) is a linear polarization type reflection polarizer (a2), a similar effect can also be obtained by disposing a biaxial retardation layer (b4) having a front retardation of about λ/2 and a retardation in the thickness direction of λ/2 or more as a retardation layer (b). Such a biaxial retardation layer (b4) with an Nz coefficient of 1.5 or more satisfies the above described required conditions.

FIG. 18 is a conceptional representation in a case where a linear polarization type reflection polarizer (a2) is employed as a reflection polarizer (a). In FIG. 18, as the polarization element (A), a linear polarization type reflection polarizer (a2), a biaxial retardation layer (b4) and a linear polarization type reflection polarizer (a2) are disposed in the order starting at the backlight side (the lower side).

FIG. 19 is an example of laminate angles of films in the collimation system shown in FIG. 18. A double head arrow mark shown on a linear polarization type reflection polarizer (a2) is the polarization axis and, a double head arrow shown on a retardation layer (b4) is the slow axis. The polarization axes of the linear polarization type reflection polarizer (a2) one above the other are arranged so as to be perpendicular to each other. The slow axis of a biaxial retardation layer (b4) and the polarization axis of a linear polarization type reflection polarizer (a2) are arranged at an angle of 45° (−45°)±5° therebetween.

Description will be given, following changes in collimated lights in the above described example shown in FIGS. 18 and 19.

1) Part of natural light (r47) supplied from a backlight impinges vertically on the linear polarization type reflection polarizer (a2).

2) The linear polarization type reflection polarizer (a2) transmits linearly polarized light (r48) and reflects linearly polarized light (r49) in a direction perpendicular to the linearly polarized light (r48).

3) The linearly polarized light (r48) transmits the biaxial retardation layer (b4) with a front retardation of about ½ wavelength and converted to linearly polarized light (r50) and a direction of the polarization axis thereof is rotated by 90°.

4) The linearly polarized light (r50) passes through the linear polarization type reflection polarizer (a2) as is.

5) Transmitted linearly polarized light (r51) impinges on a liquid crystal display and is transmitted without a loss.

6) On the other hand, part of natural light (r52) supplied from the backlight impinges obliquely on the linear polarization type reflection polarizer (a2).

7) The linear polarization type reflection polarizer (a2) transmits linearly polarized light (r53) and reflects linearly polarized light (r54) in a direction perpendicular to the linearly polarized light (r53).

8) The linearly polarized light (r53) impinges obliquely on the biaxial retardation layer (b4). Since the biaxial retardation layer (b4) has a front retardation of about ½ wavelength and an Nz coefficient of 2 or more due to the effect of the retardation in the thickness direction, the linearly polarized light (r53) transmits the biaxial retardation layer (b4) as a linearly polarized light (r55) in the same state as the linearly polarized light (r53) with respect of a direction of the polarization axis.

9) Transmitted linearly polarized light (r55) is reflected on the linear polarization type reflection polarizer (a2) and converted to reflected light (r56).

10) The reflected light (r56) impinges on the retardation layer (b4). On this occasion, the reflected light (r56) transmits without altering the axis direction.

11) Transmitted linearly polarized light (r57) passes through the linear polarization type reflection polarizer (a2) as is, as linearly polarized light (r58).

12) Reflected light (r49, r54 and r58) returns back to the backlight side and recycled.

The polarization element (A) shown in FIGS. 18 and 19 include the single biaxial retardation layer (b4) having a front retardation of about ½ wavelength and an Nz coefficient of 1.5 or more. This structure can produce almost the same characteristic as in the case where the three layered laminate in a structure in which the C-plate: the retardation layer (b1) is sandwiched between the two λ/4 plates (b2), which is shown in FIG. 14 or 15. Therefore, the number of layers in the laminate is less and somewhat more excellent in productivity as compared with those of the above described polarization element (A). Moreover, the polarization element (A) shown in FIGS. 18 and 19 is more excellent than the case where a two layer laminate is used as sown in FIGS. 16 and 17.

While in an ideal system, an angle between the slow axis of the retardation plate (b4) and the polarization axis of a linear polarization type reflection polarizer (a2) described herein theoretically in essence is 45°, characteristics of the linear polarization type reflection polarizer (a2) and the retardation plate (b4) in a practical case are not perfect in the visible light region and each have a subtle change according to a wavelength. If this is neglected and lamination is conducted at 45°, there arises a case where coloration occurs.

Therefore, by shifting an angle slightly to compensate a hue, optimization of the system in the entirety can be reasonably realized. On the other hand, if an angle is largely shifted, there arises a case where other problems such as reduction in transmittance and others occur. Therefore, it is desirable that adjustment is actually performed within a range of the order of ±5°.

In connection with a transmittance and reflectance of the linear polarization type reflection polarizer (a2), that a wavelength characteristic of a transmitted light shifts relative to incident light in an oblique direction to the short wavelength side is the same as the circular polarization type reflection polarizer (a1) using a cholesteric liquid crystal. Therefore, in order to function sufficiently on incident light at a deep angle, a necessity arises that a sufficient polarization characteristic/retardation characteristic is ensured in the long wavelength side outside the visible light region.

A polarization element (A), as shown in FIGS. 10 to 19, has a retardation layer (b) converting light impinging at an incidence angle of 30° inclined from the normal direction to polarized light with an axis direction to be reflected by two reflection polarizers (a) and the polarization element (A) functions a total reflection at an incidence angle of 30° not to transmit light at an incidence angle close to 30°. The polarization element (A) has a substantially high transmittance at an incidence angle in the range of the order of from ±15° to ±20° inclined from the normal direction while light at an incidence angle higher than the range is reflected and recycled. Hence, transmitted lights from a light source are concentrated in the above range and condensed and collimated.

Thus obtained beam collimated backlight, as features thereof, is thinner and makes a light source with a high light parallelism to be obtained with more of ease than in a conventional practice. In addition, since collimation is realized by polarizing reflection substantially without absorption loss, reflected non-collimated light component returns to the backlight side and scattering reflected, wherein only a collimated light component of the scattered reflected light is extracted for recycling, which process is repeated, thereby enabling a substantially high transmittance and a substantially high light utilization efficiency to be achieved.

A retardation anisotropy control type collimating means used in this invention is characterized by that no in-plane fine structure is visually recognized when being viewed along a surface direction in optical observation, absolutely no interference is observed between liquid crystal pixels, a black matrix, a film having a fine structure used in a collimating means, a glare-treated surface as the outermost surface of the liquid crystal display and others, which fine structures are no cause for a moiré.

A moiré, shown in FIG. 20, is a pattern of darkness and brightness having a frequency lower than that of a lattice visually recognized when layers are superimposed with lattices formed in the respective different layers at angles therebetween.

A pitch of a moiré stripe is expressed by the following formula 1:

$$\left(\frac{1}{S3}\right)^2 = \left(\frac{1}{S1}\right)^2 + \left(\frac{1}{S2}\right)^2 - \frac{2\cos\alpha}{S1 \times S2}$$

In the formula 1, S1 indicates a first lattice pitch, S2 a second lattice, S3 a moiré fringe pitch and α an angle formed between the first lattice and the second lattice.

If a visibility (V) of a moiré stripe is calculated with definition of the maximum value of intensities I of a moiré stripe obtained by superimposing different lattices in such a way as Imax, the minimum value thereof as Imin, the visibility is given by a mathematical expression: V=(Imax−Imin)/(Imax+Imin). In order to decrease the contrast, it is desirable that an angle between the lattices is sufficiently large and close to perpendicularity. Three or more layers each having a lattice is hard to satisfy the required condition. Therefore, in order to suppress a moiré phenomenon, it is effective to reduce layers each having a lattice structure and it is understood that a polarization element of this invention with no lattice structure is greatly effective for manufacture of a viewing angle magnification system.

(Reflection Polarizer (a))

It is desirable to achieve a total reflection of light with a wavelength in the vicinity of 550 nm high in visual sensitivity from the viewpoint of brightness enhancement and it is desirable that a selective reflection wavelength of the reflection polarizer (a) is superimposed on light at least in a wavelength region of 550 nm±10 nm.

In a backlight using a wedge type light guide plate adopted in more of liquid crystal displays, for example, angles of emitted lights from the light guide plate are about 60° inclined from the normal direction. A blue shift amount at this angle reaches about 100 nm. Therefore, it is understood that in a case where a 3 wavelength cold cathode fluorescent lamp is employed as the backlight, a necessity arises that a selective reflection wavelength reaches to the wavelength side longer than at least 710 nm since a red bright-line spectrum is at 610 nm. Since a selective reflection wavelength bandwidth necessary in the long wavelength side, as described above, depends largely on an incidence angle and a wavelength of incident light from the light source, a long wavelength end thereof is set arbitrarily according to required specifications.

In a case where the backlight light source emits only a specific wavelength, for example, in a case of a colored cold cathode fluorescent lamp, it is only required to enable only an obtained bright line to be shielded.

In a case where emitted lights from the backlight are confined in a range in the front direction in advance in design of a microlens, dots, a prism, and others, it is not necessary to remarkably extend a selective reflection wavelength to the long wavelength side since transmitted light at a large incidence angle can be neglected. A design can be affected properly so as to be adapted for combined members and a kind of light source.

The reflection polarizers (a) may be either a combination of absolutely the same members or a combination of one member reflecting all the wavelengths of visual light thereon and the other reflecting part thereof thereon.

(Circular Polarization Type Reflection Polarizer (a1))

For example, a cholesteric liquid crystal material is used in a circular polarization type reflection polarizer (a1). In a circular polarization type reflection polarizer (a1), a central wavelength in selective reflection is determined by a formula λ=np (wherein n indicates a refractive index of a cholesteric material and p indicates a chiral pitch). For obliquely incident light, the superimposed wavelength region is preferably wider since a selective reflection wavelength is subjected to a blue shift.

In a case where a circular polarization type reflection polarizer (a1) is made of a cholesteric materials, a similar polarizer can be obtained even in combination of different types (which are of a right hand twist and a left hand twist) in a way such that according to a similar way of thinking, a retardation is zero or λ if a front retardation is inclined at λ/2, whereas the similar polarizer is unprofitable since a problem arises because of anisotropy or coloring abnormality according to an azimuth of the inclined axis. While from such a viewpoint, it is preferable to combine members of the same type (between only members with a right hand twist or only members with a left hand twist), coloring abnormality can also be suppressed by cancellation with combination of cholesteric liquid crystal molecules one above the other or a C-plate different in wavelength distribution characteristic from each other.

A proper cholesteric liquid crystal may be used as a cholesteric liquid crystal constituting a circular polarization type reflection polarizer (a1) without imposing any specific limitation. Examples thereof that are named include: a liquid crystal polymer exhibiting a cholesteric liquid crystallinity at a high temperature; a polymerized liquid crystal obtained by polymerizing a liquid crystal monomer, and a chiral agent and an alignment agent, when both are required, with illumination of ionizing radiation such as an electron beam, ultraviolet or the like, or with heating; and a mixture thereof. While a liquid crystallinity may be either lyotropic or thermotropic, a thermotropic liquid crystal is desirable from the view point of ease of control and formability of monodomain.

Formation of a cholesteric liquid crystal layer can be performed by means of a method in conformity with a conventional alignment treatment. Exemplified are: a method in which a liquid crystal polymer is developed on a proper alignment film selected from the group: an alignment film obtained by being subjected to a rubbing treatment with a rayon cloth or the like on a film made of polyimide, polyvinyl alcohol, polyester, polyarylate, polyamide imide, polyether imide or the like formed on a support base material having as low a birefringence retardation as possible such as triacetyl cellulose, amorphous polyolefin or the like; an alignment film made of an obliquely evaporated layer made of $SiO_2$; an alignment film made of a base material using a surface nature and state of a stretched base material such as polyethylene terephthalate, polyethylene naphthalate or the like; an alignment film made of a base material with fine surface irregularity of projections and depressions having a fine alignment control force formed thereon obtained by treating a surface thereof with a fine grinding agent represented by a rubbing cloth or red iron oxide; an alignment film made of a base material having an alignment film producing a liquid crystal control force by illuminating an azobenzene compound or the like on a base material film described above with light formed thereon; and others, and the liquid crystal polymer is heated at a temperature of a glass transition temperature or higher and lower than an isotropic phase transition temperature and cooled at a temperature lower than the glass transition temperature in a planar alignment state of the liquid crystal polymer molecules into a glassy state to thereby form a fixed layer in which the alignment is fixed; and other methods.

A structure may also be fixed by illuminating with energy such as ultraviolet, an ion beam or the like at a stage where an alignment state is established. A base material with a low birefringence of the above described base materials may also be used as a liquid crystal layer support as is. In a case where a base material with a high birefringence is adopted or where a request for a thickness of a polarization element (A) is severe, a liquid crystal layer can be separated from the alignment base material for proper use.

Film formation of a liquid crystal polymer can be performed by means of a method in which a liquid crystal polymer is developed into a thin film using a solution of the liquid crystal polymer with a solvent with one of the following techniques: such as a spin coating method; a roll coating method, a flow coating method; a printing method; a dip coating method; a flow film forming method; a bar coating method; a gravure printing method and others, to further dry the thin film, when required. Examples of the solvent that can be properly used include: chlorine containing solvents such as methylene chloride, trichloroethylene and tetrachloroethane; ketone solvents such as acetone, methyl ethyl ketone and cyclohexanone; aromatic solvents such as toluene; cycloalkanes such as cycloheptane; and N-methylpyrrolidone, tetrahydrofuran and others.

One of methods can be adopted in which a heat-melt of a liquid crystal polymer and preferably a heat-melt in a state exhibiting an isotropic phase is developed in a procedure in conformity with a procedure as described above, the developed film is further developed to a thinner film while a melting temperature is maintained, if necessary, and the thinner film is then solidified. The one method is a method using no solvent; therefore, a liquid crystal polymer can be developed by a method good in hygiene in a working environment as well. Note that in development of a liquid crystal polymer, there can be adopted a superimposition scheme for cholesteric liquid crystal layers with alignment films interposed between layers for the purpose to realize a thinner, if necessary.

One of the optical layers can also be separated from a support base material/an alignment base material therefore used in film formation and transferred onto another optical material for use when required.

A circular polarization type reflection polarizer (a1) in use can be a combination of a linear polarization type reflection polarizer and a λ/4 plate. Either a single circular polarization type reflection polarizer (a1) or two or more circular polarization type reflection polarizers (a1) may be used. All of circular polarization type reflection polarizers (a1) each may also be a combination of a linear polarization type reflection polarizer and a λ/4 plate. In a case where a circular polarization type reflection polarizer (a1) is used as the lowest layer (for example, the first sheet from the backlight side), arrangement is in order of the linear polarization type reflection polarizer and then the λ/4 plate from the backlight side. In a case where a circular polarization type reflection polarizer (a1) is used as the uppermost layer, arrangement is in order of the λ/4 plate and then the linear reflection polarize from the backlight side. In a case where an intermediate layer (for example, the second sheet from the backlight side in a case of a three layer laminate) is used, the λ/4 plates are arranged on both sides of the linear polarization type reflection polarizer.

(Linear Polarization Type Reflection Polarizer (a2))

Examples of the liner polarization type reflection polarizer (a2) include: a grid type polarizer; a multilayer thin film laminate with two or more layers made of two or more kinds of materials having a difference between refractive indexes; evaporated multilayer thin film having different refractive indexes used in a beam splitter or the like; a multi-birefringence layer thin film laminate with two or more layers made of two or more kinds of materials each having birefringence; a stretched resin laminate with two or more layers using two or more kinds of resins each having a birefringence; a polarizer separating linearly polarized light by reflecting/transmitting linearly polarized light in the axis directions perpendicular to each other; and others.

A uniaxially stretched multilayer laminate can be used that is obtained by uniaxially stretching a multilayer laminate obtained by alternately laminating materials generating a retardation by stretching represented by polyethylene naphthalate, polyethylene terephthalate and polycarbonate; and resins each generating a low retardation, such as an acrylic resin represented by polymethacrylate; and a norbornene resin and others represented by ARTON manufactured by JSR Corp.

(Retardation Layer (b))

The retardation layer (b1) inserted between circular polarization type reflection polarizers (a1) or linear polarization type reflection polarizers (b2) has a retardation in the front direction of almost zero and a retardation of $\lambda/8$ or more relative to incident light at an angle of 30° inclined from the normal direction. It is desirable to have a front retardation of $\lambda/10$ or less since it is the purpose to retain vertically impinging polarized light.

Retardation relative to incident light in an oblique direction is properly determined according to an angle at which total reflection is effected for efficient polarization conversion. In order to perfectly realize total reflection at an angle of the order of 60° inclined from the normal direction, it is only required to determine a retardation so as to be a value of the order of $\lambda/2$ when measured at 60°. Since transmitted light through the circular polarization type reflection polarizer (a1) changes a polarization state thereof by a birefringence like a C-plate of the circular polarization type reflection polarizer (a1) itself as well, a retardation when measured at the angle of the C-plate that is usually inserted may be a value less than $\lambda/2$. Since a retardation of the C-plate increases monotonously with increase in inclination of incident light, a retardation has only to be $\lambda/8$ or more relative to incident light at an angle of 30° as a target value for effectively causing total reflection at inclination at an angle of 30° or more.

In a case of a design capable of an effective shield of light having an incidence angle of 30° from the front in a polarization element (A) of this invention, transmitted light is sufficiently reduced substantially in a region of an incidence angle of about 20°. In a case where light is limited in this region, transmitted is only light in a region showing a good display of a common TN liquid crystal display. There is a fluctuation due to a kind of liquid crystal in a cell, a condition of an alignment state, a pretilt angle and the like in a used TN liquid crystal display, neither gray scale inversion nor sudden degradation in contrast occurs; therefore, this is a standard adopted for magnification of a viewing angle in this invention. Other contrivances may also be applied that a larger retardation value of a retardation layer is used in order to confine only front light and that milder confinement is given with a smaller retardation value in a particular situation where a compensating retardation plate is combined with a TN liquid crystal.

Any of materials can be used in the retardation layer (b1) without a specific limitation as far as it has an optical characteristic as described above. Exemplified are: a layer having a fixed planar alignment state of a cholesteric liquid crystal having a selective reflection wavelength in a region outside a visible light region (ranging from 380 nm to 780 nm); a layer having a fixed homeotropic alignment state of a rod-like liquid crystal; a layer using columnar alignment or nematic alignment of a discotic liquid crystal; a layer in which a negative uniaxial crystal is aligned in a plane; a layer made of a biaxially aligned polymer film; and others.

As for a C-plate, for example, a C-plate having a fixed planar alignment state of a cholesteric liquid crystal having a selective reflection wavelength in a region outside the visible light region (ranging from 380 nm to 780 nm) is desirable to have no coloring abnormality in the visible light region with respect to a selective reflection wavelength of a cholesteric liquid crystal. Hence, a necessity arises for a selective reflection light not to be in the visible region. Selective reflection is specially determined by a cholesteric chiral pitch and a refractive index of a liquid crystal. A value of a central wavelength in selective reflection may be in the near infrared region, whereas it is more desirably in an ultraviolet region of 350 nm or less because of an influence of optical rotation exerted or occurrence of a slightly complex phenomenon. Formation of a cholesteric liquid crystal layer is performed in a similar way to that in formation of a cholesteric liquid crystal layer in the reflection polarizer described above.

A C-plate having a fixed homeotropic alignment state is made of a liquid crystalline thermoplastic resin showing a nematic liquid crystallinity at a high temperature; a polymerized liquid crystal obtained by polymerizing a liquid crystal monomer and an alignment agent, when required, under illumination with ionizing radiation such as an electron beam, ultraviolet or the like, or with heating; or a mixture thereof. While a liquid crystallinity may be either lyotropic or thermotropic, a thermotropic liquid crystal is desirable from the view point of ease of control and formability of monodomain. A homeotropic orientation is obtained for example in a procedure in which a birefringent material described above is coated on a film made of a vertically aligned film (such as a film of a long chain alkylsilane) and a liquid crystal state is produced and fixed in the film.

As a C-plate using a discotic liquid crystal, there is available a plate obtained by producing and fixing a nematic phase or a columnar phase in a discotic liquid crystal material having an optically negative uniaxiality such as a phthalocyanines or a triphenylene compounds each having an in-plane spread molecule as a liquid crystal material. Inorganic layered compounds each with a negative uniaxiality are detailed in a publication of JP-A No. 6-82777 and others.

A C-plate using a biaxial alignment of a polymer film can be obtained by one of the following methods, in which a polymer film having positive refractive index anisotropy is biaxially stretched in a good balance; in which a thermoplastic resin is pressed; and in which a C-plate is cut off from a parallel aligned crystal.

In a case where a linear polarization type reflection polarizer (a2) is employed, adopted is a retardation layer (b1) having retardation in the front direction of almost zero and a retardation of $\lambda/4$ or more relative to incident light incoming at an angle of 30° inclined from the normal direction. Linearly polarized light is converted to circularly polarized light using a structure in which the retardation layer (b1) is sandwiched between $\lambda/4$ plates (b2) each having a front retardation of about $\lambda/4$ and thereafter, the circularly polarized lights can be collimated by means of a similar way to that in the circular polarizing plate described above. A section of the structure and arrangement of layers thereof in this case are as shown in FIGS. 13, 14 and 15. In the case, an angle formed between the slow axis of a $\lambda/4$ plate (b2) and the polarization axis of a linear polarization type reflection polarizer (a2) is as described above and an angle between the axes of the $\lambda/4$ plates (b2) can be arbitrarily set.

To be concrete, a λ/4 plate is used as the retardation layer (b2). A λ/4 plate in use is a proper retardation plate adapted for a purpose of use. The λ/4 plate can control an optical characteristic such as a retardation in lamination of two or more kinds of retardation plates. Examples of retardation plates include: birefrengent films obtained by stretching films made of proper polymers such as polycarbonate, norbornene resin, polyvinyl alcohol, polystyrene, polymethylmethacrylate, polypropylene, other polyolefins, polyarylate, polyamide and others; alignment films each made of a liquid crystal material such as a liquid crystal polymer; alignment layers each made of a liquid crystal material supported by a film; and others.

A retardation plate functioning as a λ/4 plate in a broad wavelength range such as the visible light region can be obtained by a method in which, for example, a retardation layer functioning as a λ/4 plate for monochromatic light with a wavelength of 550 nm, a retardation layer exhibiting another retardation characteristic, for example a retardation layer functioning as a ½ wavelength plate are superimposed one on the other, or the like method. Therefore, a retardation plate inserted between a polarizing plate and a brightness enhancement film may be made with one, or two or more retardation layers.

A similar effect can be attained by disposing two biaxial retardation layers (b3) each having a front retardation of about λ/4 and a retardation in the thickness direction of λ/2 or more. A biaxial retardation layer (b3) with an Nz coefficient of about 2 or more satisfies the above described required condition. A section of the structure and arrangement of layers thereof in this case are as shown in FIGS. 16 and 17. In the case, a relationship between the slow axis of a biaxial retardation layer (b3) and the polarization axis of a linear polarization type reflection polarizer (a2) are as described above and an angle between the axes of biaxial retardation layers (b3) themselves can be set arbitrarily.

Note that a front retardation of about λ/4 means that the retardation is preferably on the order of λ/4±40 nm and more preferably on the order of λ/4±15 nm relative to light with a wavelength of 550 nm.

A similar effect can also be obtained by using one biaxial retardation layer (b4) having a front retardation of about λ/2 and a retardation in the thickness direction of λ/2 or more. A biaxial retardation layer (b4) with an Nz coefficient of about 1.5 or more satisfies the above described required condition. A section of the structure and arrangement of layers thereof in this case are as shown in FIGS. 18 and 19. In the case, a relationship between the axes of the linear polarization type reflection polarizers (a2) one above the other and the axis of the biaxial retardation layer (b4) inserted in the middle assumes angles as designated and the angles are specially determined.

Note that a front retardation of about λ/2 means that the retardation is preferably on the order of λ/2±40 nm and more preferably on the order of λ/2±15 nm relative to light with a wavelength of 550 nm.

As the biaxial retardation layers (b3) and (b4), employed are, to be concrete, a layer obtained by biaxially stretching a plastic material having birefringence such as polycarbonate, polyethylene terephthalate or the like; and a layer obtained by uniaxially aligning a liquid crystal material in a plane direction and further aligning the liquid crystal material in the thickness direction so as to have hybrid alignment. A layer obtained by subjecting a liquid crystal material to uniaxial homeotropic alignment can be employed, which is formed by means of a method similar to the method used in film formation of the cholesteric liquid crystal. A necessity arises for use of a nematic liquid crystal material instead of a cholesteric liquid crystal material.

In the polarizing element (A) used as the transmittance angle dependent polarizing element (T2) in the above description, reflection polarizers of a circular polarization type (a1) or a linear polarization type (a2), that is reflection polarizers (a) of the same type have been employed. In a case where a circular polarization type reflection polarizers (a1) are employed, a polarization state in an oblique direction inclined from the normal direction of a single reflection polarizer (a1) is greatly changed; therefore, a problem arises that a polarization degree is reduced. In this case, collimated light is greatly colored when an angle from the normal direction of a light source is large (60° or more). In a case where the linear polarization type reflection polarizers (a2) are employed, a polarization state in an oblique direction is very good, whereas a retardation layer having a front retardation is disposed so as take 45° relative to the polarization axes between the reflection polarizers; therefore, anisotropy in the axis direction due to a viewing angle increases. As a result, a direction of a high light condensation and a direction of a low light condensation are mixed depending on the direction on a screen image.

Description will be given of a case where in a polarizing element (A) used as a transmittance angle dependent polarizing layer (T2) below: in a transmittance angle dependent polarizing layer (T2) at least one reflection polarizer (a) is a circular polarization type reflection polarizer (a1) transmitting circularly polarized light, while selectively reflecting reverse circularly polarized light, and at least one reflection polarizer (a) is a linear polarization type reflection polarizer (a2) transmitting one of linearly polarized lights perpendicular to each other, while selectively reflecting the other thereof; and a retardation layer (b) is a layer (b1) having a front retardation (in the normal direction) of almost λ/4 and a retardation value of λ/8 or more for incident light incoming at a direction inclined from the normal direction by 30° or more.

An optical element in which at least one circular polarization type reflection polarizer (a1) and at least one linear polarization type reflection polarizer (a2) are employed and a retardation layer (b1) is inserted between the polarizers of different types can effectively shield transmitted light of incident light in an oblique direction and has an excellent brightness characteristic and can control by coloration.

FIGS. 21 and 22 are sectional views of optical elements each including a layer (b1) having a front retardation (in the normal direction) of almost λ/4 in a visible light wavelength region and a retardation of λ/8 or more for incident light incoming at a direction inclined from the normal direction by 30° or more is inserted between a circular polarization type reflection polarizer (a1) and a linear polarization type reflection polarizer (a2). The lower sides of the sectional views of FIGS. 21 and 22 are respective sidelight type backlight light guide plates (L). The circular polarization type reflection polarizer (a1) and the linear polarization type reflection polarizer (a2) in use can be ones similar to those as described above.

(Retardation Layer (b1))

The retardation layer (b1) has a front retardation (in the normal direction) of almost λ/4 and a retardation of λ/8 or more for incident light incoming at a direction inclined from the normal direction by 30° or more in the visible light region. Generally, the front retardation is preferably in the range of about λ/4±40 nm and more preferably in the range of λ/4±15 nm for light with a wavelength of 550 nm. The retardation layer (b1) is arranged so that the polarization axis of the linear polarization type reflection polarizer (a2) and the slow axis of the retardation layer (b1) take an angle therebetween in the range of 45° (or −45°)±5°.

Since a front retardation is set for a purpose to convert a linearly polarized light to a circularly polarized light or convert circularly polarized light to linearly polarized light in a polarization state of normally incident light, it is desirably about λ/4 and more desirably about λ/4 over all the visible light region.

A front retardation for incident light in an oblique direction is properly determined by an angle at which the incident light is totally reflected to effectively cause conversion in polarization state or the like. For example, in order to effect total reflection at an angle of the order of about 60° relative to the normal line, a retardation has only to be decided to assume a value of about λ/2 when being measured at an angle of 60° from the normal line. Since transmitted light through a reflection polarizer has changed in polarization state even due to a birefringence as done in a C-plate of the reflection polarizer itself, the retardation of a commonly inserted C-plate when being measured at the angle may be smaller than λ/2. Since the retardation of a C-plate monotonously increases as incident light is inclined more, the retardation has only to be a value of λ/4 or more for incident light at an angle of 30° as a guide at which total reflection effectively occurs at an inclination angle of 30° or more.

One retardation layer (b1) may be used alone, or two or more retardation layers (b1) combined may be used. Used as one retardation layer (b1) may be, for example, a biaxial retardation layer with a front retardation (in the normal direction) of almost λ/4 and an Nz coefficient of 2.0 or more or a biaxial retardation layer with a front difference (in the normal direction) of almost λ/4 and an Nz coefficient of −1.0 or less. The direction of the slow axis of the biaxial retardation layer is arranged at an angle in the range of 45° (or −45°)±5° relative to the polarization axis of a linear polarization type reflection polarizer (a2).

Two-layer retardation layer (b1), as shown in FIGS. 23 and 24, has a front retardation (in the normal direction) of almost zero, and each are a composite of a layer (b11) having λ/8 or more for incident light obliquely incoming at a direction inclined from the normal direction by 30° or more and a uniaxial retardation layer (b12) with a front retardation (in the normal direction) of almost λ/4 and an Nz coefficient of 1.0. That is, in a case of two or more-layer retardation layer, a retardation of one uniaxial retardation layer (b12), or one or more layers in the front direction is almost zero, and the multilayer retardation layer may be a composite of one uniaxial retardation layer (b12) and C-plates (b11) for incident light obliquely incoming at a direction inclined from the normal direction. Since a front retardation is set for a purpose to sustain a polarization state of normally incident light, the retardation is desirably λ/10 or less.

The slow axis direction of the uniaxial retardation layer (b12) is arranged at an angle in the range of 45° (−45°)±5° relative to the polarization axis of the linear polarization type reflection polarizer (a2). Note that in a case where the retardation layer (b1) is a composite of the layer (b11) and the uniaxial retardation layer (b12), the layer (b11) is, as shown in FIGS. 3 and 4, preferably disposed on the circular polarization type reflection polarizer (a1) side.

No specific limitation is imposed on a material of a retardation layer (b1), and any of materials can be used as far as the material has the optical characteristic described above. No specific limitation is placed on a biaxial retardation layer and a uniaxial retardation layer (b12) and any of plastic materials each having birefringence and being stretched can be used, a liquid crystal material subjected to homeotropic alignment in uniaxiality, which is performed similar to the method for forming a film of the cholesteric liquid crystal, may be employed. However, a nematic liquid crystal is necessary to be used but a cholesteric liquid crystal material cannot be used. The C-plate exemplified above can be used as a retardation layer (b11) that is a C-plate.

In a case where a transmittance angle dependent polarizing layer (T2) is employed; an optical layer (D) having a polarization canceling ability is applied to the case. A retardation plate can be preferably used as the optical layer (D). Preferable as the retardation plate is one in which a change in retardation value or axis displacement exists locally. For example, a general biaxially stretched polyester film and the like are adopted. To be concrete, Lumirror manufactured by TORAY Industries Inc. can be exemplified. In a case where an optical layer (D) is, as shown in FIG. 10(c), placed on the surface of a repetitive slope structure of a reflection plate (R), a reflecting layer is formed on an optical layer (D) having a repetitive slope structure to thereby enable the structure to be achieved.

In a case where a light source of the invention is applied to a liquid crystal display, a dichroic linear polarizer (P) is laminated on the outer side of a transmittance angle dependent layer (T1) or a transmittance angle dependent polarizing layer (T2), which is disposed on the liquid cell side.

In a case of the transmittance angle dependent polarizing layer (T2) in which polarized light transmitted through the transmittance angle dependent polarizing layer (T2) is a linearly polarized light, the polarization axis thereof and the polarization axis of a dichroic linear polarizer (P) coincide with each other. In a case where polarized light after being transmitted through a transmittance angle dependent polarizing layer (T2) is a circularly polarized light, a dichroic linear polarizer (P) is, in order to convert a circularly polarized light to a linearly polarized light, disposed with a λ/4 plate interposed therebetween. The λ/4 plate may be a λ/4 plate similar to the retardation layer (b12), but desirable is a λ/4 plate with an Nz coefficient in the range of from −1.0 to −2.0.

(Lamination of Layers)

In manufacturing the polarizing element (A), lamination of each of the layers may be realized only by being laminated on a preceding layer, while it is preferable to laminate the layers with an adhesive agent or a pressure-sensitive adhesive agent from the viewpoint of workability and light utilization efficiency. In that case, it is desirable from the viewpoint of suppressed surface reflection that an adhesive agent or a pressure-sensitive adhesive agent is transparent and does not have absorption in the visible light region, and have refractive indexes closest possible to refractive indexes of the layers. Preferably used from the view point are an acrylic pressure-sensitive adhesive agent and the like. The following methods can be adopted: one method in which each of the layers forms monodomain with the help of an alignment film separately from the others and sequentially laminated by transfer the layers onto a light transparent base material; and the other in which each of the layers is sequentially formed directly on a preceding layer while forming an alignment film or the like for alignment in a proper manner.

It is possible to further add particles for adjusting diffusibility, when required, to thereby impart isotropic scatterbility, and to properly add an ultraviolet absorbent, an antioxidant, and a surfactant for a purpose to impartation of a leveling property in film formation, in each of the layers and (pressure-sensitive) adhesive layers.

(Light Source)

A proper diffusion plate, though not especially necessary in a light source of the invention, can be inserted between a transmittance angle dependent layer (T1) or a transmittance angle dependent polarizing layer (T2) and a sidelight type backlight light guide plate (L). However, it is not preferable in the invention to use a diffusion plate with a high haze in order to raise a front peak of emitting light. A haze is usually 80% or less and preferably 70% or less. For example, preferably used are Light-up 100TL4 (with haze of 40%), 100TL2 (with haze of 29%) or the like, manufactured by Kabushiki Kaisha Kimoto.

In the invention, since a prism sheet is not disposed direct under a liquid crystal display, moiré to be caused by the prism sheet is not visually recognized. The invention has a feature that a prism is disposed below a reflecting light guide plate with a slope structure to thereby reduce brightness irregularity and moiré to a level at which they are difficult to be visually recognized. Hence, useful is a diffusion plate with a low haze and a high transmittance instead of using a diffusion plate with a high haze which reduces a transmittance of all light beams to thereby decrease light condensation in the front direction. This is because light beams obliquely coming and reflected on the surface are scattered in the vicinity of a backlight light guide plate and part of the light beams are scattered in the normally incident direction to thereby enhance a recycling efficiency of light. A diffusion plate is obtained by forming depressions and protrusions on a surface thereof or in addition, obtained by means of a method in which fine particles different in refractive index from one another are buried in a resin so as to be wrapped therewith. The diffusion plate may be inserted between a transmittance angle dependent layer (T1) or a transmittance angle dependent polarizing layer (T2) and a backlight, or alternatively, the diffusion plate may be adhered onto the transmittance angle dependent layer (T1) or the transmittance angle dependent polarizing layer (T2).

In a case where a liquid crystal cell to which a transmittance angle dependent layer (T1) or a transmittance angle dependent polarizing layer (T2) is adhered is disposed in the vicinity of a backlight, there arises an unfavorable possibility to generate Newton's rings in a clearance between a film surface and the backlight, whereas by disposing a diffusion plate with depressions and protrusions on a surface thereof on a surface, on the light guide plate side, of a transmittance angle dependent layer (T1) or a transmittance angle dependent polarizing layer (T2) in the invention, generation of Newton's rings can be suppressed. Besides, a construction may be adopted in which a layer providing a depression and protrusion structure and a light diffuse structure may be formed as the surface of the transmittance angle dependent layer (T1) or the transmittance angle dependent polarizing layer (T2).

(Liquid Crystal Display)

The light source is preferably applied to a liquid crystal display in which a polarizing plate is arranged on both sides of a liquid crystal cell.

A diffusion plate having neither backscattering nor polarization canceling characteristic is laminated on the viewing side of a liquid cell in a liquid crystal display combined with the collimated backlight to thereby diffuse light beams with a good display characteristic in the vicinity of the front and to obtain a uniform and good display characteristic over all the viewing angle, thereby enabling a broader viewing angle to be achieved.

A viewing angle magnifying film used here is a diffusion plate having substantially no backscattering. A diffusion plate can be provided with a diffusion pressure-sensitive material. An arrangement place thereof can be used above or below a polarizing plate on the viewer side of the liquid crystal display. In order to prevent reduction in contrast due to an influence such as bleeding of pixels or a slightly remaining backscattering, the diffusion plate is desirably provided in a layer at a position closest possible to a cell such as between a polarizing plate and a liquid crystal cell. In this case, it is desirable to use a film that does not substantially cancel polarization. A fine particle distribution type diffusion plate is preferably used, which is disclosed in, for example, the publications of JP-A No. 2000-347006 and JP-A No. 2000-347007.

In a case where a viewing angle magnifying film is disposed outside of a polarizing plate on the viewer side of a liquid crystal cell, a viewing angle compensating retardation plate may not be used especially if a TN liquid crystal cell is used since collimated lights are transmitted through a liquid crystal cell and through the polarizing plate. If an STN liquid crystal cell is used in the case, it has only to use a retardation film that is well compensated with respect to a front characteristic. Since, in this case, a viewing angle magnifying film has a surface exposed to air, a type having a refractive effect due to a surface profile can also be employed.

On the other hand, in a case where a viewing angle magnifying film is inserted between a polarizing plate and a liquid crystal cell, light is diffused light at the stage where light is transmitted through the polarizing plate. If a TN liquid crystal is used, a necessity arises for compensating a viewing angle characteristic of the polarizer itself. In this case, it is necessary to insert a retardation plate to compensate a viewing angle characteristic of a polarizing plate between the polarizing plate and the viewing angle magnifying film. If an STN liquid crystal is used, it is necessary to insert a retardation plate to compensate a viewing angle characteristic of the polarizing plate in addition to a front retardation compensation for the STN liquid crystal.

In a case of a viewing angle magnifying film having a regular structure in the interior thereof such as a microlens array or a hologram film, both conventionally having been available, interference has occurred with a fine structure such as a microlens array, a prism array, a louver, a micromirror array or the like that is included in a black matrix of a liquid crystal display or a collimation system of a conventional backlight to thereby cause a moiré pattern with ease. Since in a collimating film in this invention, a regular structure is not visually recognized in a plane thereof and emitted light has no regularity modulation, no necessity arises for consideration of matching with a viewing angle magnifying film or an arrangement sequence. Therefore, a viewing angle magnifying film has a lot of options since no specific limitation is imposed thereon, if neither interference nor a moiré pattern occurs with a pixel black matrix of a liquid crystal display.

In this invention, as viewing angle magnifying films, preferably used are a light scattering plate, having no substantial backscattering and not canceling polarization, which is described in any of the publications of JP-A Nos. 2000-347006 and 2000-347007 and which has a haze in the range of 80% to 90%. Any of layers each of which has a regular structure in the interior thereof such as a hologram sheet, a microprism array, a microlens array or the like can be used, if neither interference nor a moiré pattern occurs with a pixel black matrix of a liquid crystal display.

(Other Materials)

Note that various other kinds of optical layers are properly employed according a common method to thereby, manufacture a liquid crystal display.

The λ/4 plate in use is a proper retardation plate adapted for a purpose of use. The λ/4 plate can control an optical characteristic such as a retardation in lamination of two or more kinds of retardation plates. Examples of retardation plates include: birefrengent films obtained by stretching films made of proper polymers such as polycarbonate, norbornene resin, polyvinyl alcohol, polystyrene, polymethylmethacrylate, polypropylene, other polyolefins, polyarylate, polyamide and others; alignment films each made of a liquid crystal material such as a liquid crystal polymer; alignment layers each made of a liquid crystal material supported by a film; and others. Thickness of the λ/4 plate is preferably about 0.5 to 200 μm, especially preferably 1 to 100 μm.

A retardation plate functioning as a λ/4 plate in a broad wavelength range such as the visible light region can be obtained by a method in which, for example, a retardation layer functioning as a λ/4 plate for monochromatic light with a wavelength of 550 nm, a retardation layer exhibiting another retardation characteristic, for example a retardation layer functioning as a ½ wavelength plate are superimposed one on the other, or the like method. Therefore, a retardation plate inserted between a polarizing plate and a brightness enhancement film may be made with one, or two or more retardation layers.

Commonly used is a polarizing plate having a protective film on one side or both sides of a polarizer.

A polarizer is not limited especially but various kinds of polarizer may be used. As a polarizer, for example, a film that is uniaxially stretched after having dichromatic substances, such as iodine and dichromatic dye, absorbed to hydrophilic high molecular weight polymer films, such as polyvinyl alcohol type film, partially formalized polyvinyl alcohol type film, and ethylene-vinyl acetate copolymer type partially saponified film; poly-ene type orientation films, such as dehydrated polyvinyl alcohol and dehydrochlorinated polyvinyl chloride, etc. may be mentioned. In these, a polyvinyl alcohol type film on which dichromatic materials such as iodine is absorbed and oriented after stretched is suitably used. Although thickness of polarizer is not especially limited, the thickness of about 5 to 80 μm is commonly adopted.

A polarizer that is uniaxially stretched after a polyvinyl alcohol type film dyed with iodine is obtained by stretching a polyvinyl alcohol film by 3 to 7 times the original length, after dipped and dyed in aqueous solution of iodine. If needed the film may also be dipped in aqueous solutions, such as boric acid and potassium iodide, which may include zinc sulfate, zinc chloride. Furthermore, before dyeing, the polyvinyl alcohol type film may be dipped in water and rinsed if needed. By rinsing polyvinyl alcohol type film with water, effect of preventing un-uniformity, such as unevenness of dyeing, is expected by making polyvinyl alcohol type film swelled in addition that also soils and blocking inhibitors on the polyvinyl alcohol type film surface may be washed off. Stretching may be applied after dyed with iodine or may be applied concurrently, or conversely dyeing with iodine may be applied after stretching. Stretching is applicable in aqueous solutions, such as boric acid and potassium iodide, and in water bath.

As the transparent protective film prepared on one side or both sides of the polarizer, materials is excellent in transparency, mechanical strength, heat stability, water shielding property, isotropy, etc. may be preferably used. As materials of the above-mentioned transparent protective film, for example, polyester type polymers, such as polyethylene terephthalate and polyethylenenaphthalate; cellulose type polymers, such as diacetyl cellulose and triacetyl cellulose; acrylics type polymer, such as poly methylmethacrylate; styrene type polymers, such as polystyrene and acrylonitrile-styrene copolymer (AS resin); polycarbonate type polymer may be mentioned. Besides, as examples of the polymer forming a protective film, polyolefin type polymers, such as polyethylene, polypropylene, polyolefin that has cyclo-type or norbornene structure, ethylene-propylene copolymer; vinyl chloride type polymer; amide type polymers, such as nylon and aromatic polyamide; imide type polymers; sulfone type polymers; polyether sulfone type polymers; polyetherether ketone type polymers; poly phenylene sulfide type polymers; vinyl alcohol type polymer; vinylidene chloride type polymers; vinyl butyral type polymers; allylate type polymers; polyoxymethylene type polymers; epoxy type polymers; or blend polymers of the above-mentioned polymers may be mentioned. Films made of heat curing type or ultra-violet ray curing type resins, such as acryl based, urethane based, acryl urethane based, epoxy based, and silicone based, etc. may be mentioned as materials of the above-mentioned transparent protective film.

Moreover, as is described in Japanese Patent Laid-Open Publication No. 2001-343529 (WO 01/37007), polymer films, for example, resin compositions including (A) thermoplastic resins having substituted and/or non-substituted imido group is in side chain, and (B) thermoplastic resins having substituted and/or non-substituted phenyl and nitrile group in side chain may be mentioned. As an illustrative example, a film may be mentioned that is made of a resin composition including alternating copolymer comprising iso-butylene and N-methyl maleimide, and acrylonitrile-styrene copolymer. A film comprising mixture extruded article of resin compositions etc. may be used.

In general, a thickness of the protection film, which can be determined arbitrarily, is 500 μm or less, preferably 1 to 300 μm, and especially preferably 5 to 200 μm in viewpoint of strength, work handling and thin layer Moreover, it is preferable that the protective film may have as little coloring as possible. Accordingly, a protective film having a retardation value in a film thickness direction represented by $Rth=[(nx+ny)/2-nz] \times d$ of −90 nm to +75 nm (where, nx and ny represent principal indices of refraction in a film plane, nz represents refractive index in a film thickness direction, and d represents a film thickness) may be preferably used. Thus, coloring (optical coloring) of polarizing plate resulting from a protective film may mostly be cancelled using a protective film having a retardation value (Rth) of −90 nm to +75 nm in a thickness direction. The retardation value (Rth) in a thickness direction is preferably −80 nm to +60 nm, and especially preferably −70 nm to +45 nm.

As a protective film, if polarization property and durability are taken into consideration, cellulose based polymer, such as triacetyl cellulose, is preferable, and especially triacetyl cellulose film is suitable. In addition, when the protective films are provided on both sides of the polarizer, the protective films comprising same polymer material may be used on both of a front side and a back side, and the protective films comprising different polymer materials etc. may be used. Adhesives are used for adhesion processing of the above described polarizer and the protective film. As adhesives, isocyanate derived adhesives, polyvinyl alcohol derived adhesives, gelatin derived adhesives, vinyl polymers derived latex type, aqueous polyurethane based adhesives, aqueous polyesters derived adhesives, etc. may be mentioned.

A hard coat layer may be prepared, or antireflection processing, processing aiming at sticking prevention, diffusion or anti glare may be performed onto the face on which the polarizing film of the above described transparent protective film has not been adhered.

A hard coat processing is applied for the purpose of protecting the surface of the polarizing plate from damage, and this hard coat film may be formed by a method in which, for example, a curable coated film with excellent hardness, slide property etc. is added on the surface of the transparent protective film using suitable ultraviolet curable type resins, such as acrylic type and silicone type resins. Antireflection processing is applied for the purpose of antireflection of outdoor daylight on the surface of a polarizing plate and it may be prepared by forming an antireflection film according to the conventional method etc. Besides, a sticking prevention processing is applied for the purpose of adherence prevention with adjoining layer.

In addition, an anti glare processing is applied in order to prevent a disadvantage that outdoor daylight reflects on the surface of a polarizing plate to disturb visual recognition of transmitting light through the polarizing plate, and the processing may be applied, for example, by giving a fine concavo-convex structure to a surface of the protective film using, for example, a suitable method, such as rough surfacing treatment method by sandblasting or embossing and a method of combining transparent fine particle. As a fine particle combined in order to form a fine concavo-convex structure on the above-mentioned surface, transparent fine particles whose average particle size is 0.5 to 50 μm, for example, such as inorganic type fine particles that may have conductivity comprising silica, alumina, titania, zirconia, tin oxides, indium oxides, cadmium oxides, antimony oxides, etc., and organic type fine particles comprising cross-linked of non-cross-linked polymers may be used. When forming fine concavo-convex structure on the surface, the amount of fine particle used is usually about 2 to 50 weight parts to the transparent resin 100 weight parts that forms the fine concavo-convex structure on the surface, and preferably 5 to 25 weight parts. An anti glare layer may serve as a diffusion layer (viewing angle expanding function etc.) for diffusing transmitting light through the polarizing plate and expanding a viewing angle etc.

In addition, the above-mentioned antireflection layer, sticking prevention layer, diffusion layer, anti glare layer, etc. may be built in the protective film itself, and also they may be prepared as an optical layer different from the transparent protective film.

A retardation plate is laminated on a polarizing plate as a viewing angle compensating film and used as a wide viewing angle polarizing plate. A viewing angle compensating film is a film for magnifying a viewing angle so as to enable an image to be viewed with relatively sharpness even in a case where a screen image of a liquid crystal display is viewed not in a direction normal to the screen but in a slightly oblique direction relative to the screen.

As such viewing angle compensating retardation plates, there are available, in addition thereto, a film having a birefringence obtained by a biaxially stretching treatment, a stretching treatment in two directions perpendicular to each other or the like and a biaxially stretched film such as an inclined alignment film. As inclined alignment film, for example, a film obtained using a method in which a heat shrinking film is adhered to a polymer film, and then the combined film is heated and stretched or shrunk under a condition of being influenced by a shrinking force, or a film that is oriented in oblique direction may be mentioned. The viewing angle compensation film is suitably combined for the purpose of prevention of coloring caused by change of visible angle based on retardation by liquid crystal cell etc. and of expansion of viewing angle with good visibility.

Besides, a compensation plate in which an optical anisotropy layer consisting of an alignment layer of liquid crystal polymer, especially consisting of an inclined alignment layer of discotic liquid crystal polymer is supported with triacetyl cellulose film may preferably be used from a viewpoint of attaining a wide viewing angle with good visibility.

No specific limitation is, in addition to the above described condition, imposed on optical layers laminated when being actually used and there can be used one, or two or more optical layers that have an opportunity to be used in formation of a liquid crystal display and others, such as a reflection plate and a transflective plate. Examples thereof especially include: a reflection type polarizing plate and a transflective type polarizing plate obtained by laminating a reflection plate and a transflective plate, respectively, on an elliptic polarizing plate or a circular polarizing plate.

A reflective layer is prepared on a polarizing plate to give a reflection type polarizing plate, and this type of plate is used for a liquid crystal display in which an incident light from a view side (display side) is reflected to give a display. This type of plate does not require built-in light sources, such as a backlight, but has an advantage that a liquid crystal display may easily be made thinner. A reflection type polarizing plate may be formed using suitable methods, such as a method in which a reflective layer of metal etc. is, if required, attached to one side of a polarizing plate through a transparent protective layer etc.

As an example of a reflection type polarizing plate, a plate may be mentioned on which, if required, a reflective layer is formed using a method of attaching a foil and vapor deposition film of reflective metals, such as aluminum, to one side of a matte treated protective film. Moreover, a different type of plate with a fine concavo-convex structure on the surface obtained by mixing fine particle into the above-mentioned protective film, on which a reflective layer of concavo-convex structure is prepared, may be mentioned. The reflective layer that has the above-mentioned fine concavo-convex structure diffuses incident light by random reflection to prevent directivity and glaring appearance, and has an advantage of controlling unevenness of light and darkness etc. Moreover, the protective film containing the fine particle has an advantage that unevenness of light and darkness may be controlled more effectively, as a result that an incident light and its reflected light that is transmitted through the film are diffused. A reflective layer with fine concavo-convex structure on the surface effected by a surface fine concavo-convex structure of a protective film may be formed by a method of attaching a metal to the surface of a transparent protective layer directly using, for example, suitable methods of a vacuum evaporation method, such as a vacuum deposition method, an ion plating method, and a sputtering method, and a plating method etc.

Instead of a method in which a reflection plate is directly given to the protective film of the above-mentioned polarizing plate, a reflection plate may also be used as a reflective sheet constituted by preparing a reflective layer on the suitable film for the transparent film. In addition, since a reflective layer is usually made of metal, it is desirable that the reflective side is covered with a protective film or a polarizing plate etc. when used, from a viewpoint of preventing deterioration in reflectance by oxidation, of maintaining an initial reflectance for a long period of time and of avoiding preparation of a protective layer separately etc.

In addition, a transflective type polarizing plate may be obtained by preparing the above-mentioned reflective layer as a transflective type reflective layer, such as a half-mirror etc. that reflects and transmits light. A transflective type polarizing plate is usually prepared in the backside of a liquid crystal cell and it may form a liquid crystal display of a type in which a picture is displayed by an incident light reflected from a view side (display side) when used in a comparatively well-lighted atmosphere. And this unit displays a picture, in a comparatively dark atmosphere, using embedded type light sources, such as a back light built in backside of a transflective type polarizing plate. That is, the transflective type polarizing plate is useful to obtain of a liquid crystal display of the type that saves energy of light sources, such as a back light, in a well-lighted atmosphere, and can be used with a built-in light source if needed in a comparatively dark atmosphere etc.

Moreover, the polarizing plate may consist of multi-layered film of laminated layers of a polarizing plate and two of more of optical layers as the above-mentioned separated type polarizing plate. Therefore, a polarizing plate may be a reflection type elliptically polarizing plate or a transflective type elliptically polarizing plate, etc. in which the above-mentioned reflection type polarizing plate or a transflective type polarizing plate is combined with above described retardation plate respectively.

The elliptically polarizing plate and the reflection type elliptically polarizing plate are obtained by laminating the polarizing plate or the reflection type polarizing plate with a retardation plate in proper combination. The elliptically polarizing plate or the like can be formed by sequentially laminating the (reflection type) polarizing plate and a retardation plate individually in a fabrication process for a liquid crystal display so as to combine the reflective polarizing plate and the retardation plate, while an optical film such as an elliptically polarizing plate or the like obtained by lamination in advance is excellent in stability of a quality and operability in lamination, leading to advantage to improve a fabrication efficiency of a liquid crystal display.

A pressure-sensitive adhesive layer or an adhesive layer can also be provided in an optical element of this invention. A pressure-sensitive layer can be used for adherence to a liquid crystal cell and in addition, is used in lamination of optical layers. In adherence of the optical film, the optical axis thereof can be set at a proper arrangement angle in adaptation for a retardation characteristic as a target.

As the pressure sensitive adhesive agent or the adhesive agent is not especially limited. For example, polymers such as acrylic type polymers; silicone type polymers; polyesters, polyurethanes, polyamides, polyvinyl ethers, vinyl acetate/vinyl chloride copolymers, modified polyolefines, epoxy type; and rubber type such as fluorine type, natural rubber, synthetic rubber may be suitably selected as a base polymer. Especially, the one which is excellent in optical transparency, showing adhesion characteristics with moderate wettability, cohesiveness and adhesive property and has outstanding weather resistance, heat resistance, etc. may be preferably used.

The pressure sensitive adhesive agent or the adhesive agent adhesive may contain cross-linking agent according to a base polymer. And the adhesive agent adhesive may contain additives, for example, such as natural or synthetic resins, adhesive resins, glass fibers, glass beads, metal powder, fillers comprising other inorganic powder etc., pigments, colorants and antioxidants. Moreover, it may be an adhesive layer that contains fine particle and shows optical diffusion nature.

An adhesive agent and a pressure-sensitive adhesive agent each are usually used as an adhesive agent solution of a base polymer or a composition thereof dissolved or dispersed in a solvent at a solid matter concentration of the order in the range of from 10 to 50 wt %. An organic solvent can be properly selected from the group consisting of toluene, ethyl acetate and others; water; or others, so as to be adapted for a kind of an adhesive agent for use.

An adhesive layer and pressure-sensitive adhesive layer may also be prepared on one side or both sides of a polarizing plate or an optical film as a layer in which pressure sensitive adhesives with different composition or different kind etc. are laminated together. Moreover, when adhesive layers are prepared on both sides, adhesive layers that have different compositions, different kinds or thickness, etc. may also be used on front side and backside of a polarizing plate or an optical film. Thickness of an adhesive layer may be suitably determined depending on a purpose of usage or adhesive strength, etc., and generally is 1 to 500 µm, preferably 5 to 200 µm, and more preferably 10 to 100 µm.

A temporary separator is attached to an exposed side of an adhesive layer to prevent contamination etc., until it is practically used. Thereby, it can be prevented that foreign matter contacts adhesive layer in usual handling. As a separator, without taking the above-mentioned thickness conditions into consideration, for example, suitable conventional sheet materials that is coated, if necessary, with release agents, such as silicone type, long chain alkyl type, fluorine type release agents, and molybdenum sulfide may be used. As a suitable sheet material, plastics films, rubber sheets, papers, cloths, no woven fabrics, nets, foamed sheets and metallic foils or laminated sheets thereof may be used.

In addition, in the present invention, ultraviolet absorbing property may be given to the above-mentioned each layer, such as a optical element etc., etc. and a pressure-sensitive adhesive layer etc, using a method of adding UV absorbents, such as salicylic acid ester type compounds, benzophenol type compounds, benzotriazol type compounds, cyano acrylate type compounds, and nickel complex salt type compounds.

EXAMPLES

Description will be given of the present invention showing examples, while this invention is not restricted to the examples and the comparative Examples shown below.

Note that as to a front retardation, a direction in which an in-plane refractive index is maximized is referred to as X axis, a direction perpendicular to the X axis as Y axis and the thickness direction of a film as Z axis, and refractive indexes in the axis directions as nx, ny and nz, respectively; and from the refractive indexes nx, ny and nz at 550 nm measured with an automatic birefringence measuring instrument (manufactured by Oji Scientific Instruments with a trade name of automatic birefringence meter KOBRA21ADH) and a thickness d (nm) of a retardation layer, a front retardation: (nx−ny)×d was calculated. Retardation when measured in an inclined state can be measured with the automatic birefringence measuring instrument.

Note that a reflectance spectrum was measured with a spectrophotometer (Instant multiphotometry system MCPD-2000, manufactured by Otsuka Electronics Co., Ltd.) and a reflection wavelength band is defined as a wavelength band having a half value of the maximum reflectance.

A front brightness of each of the light sources obtained in Examples and Comparative Examples was measured with a brightness meter BM7 manufactured by TOPCON Corporation. A total accumulated light quantity of emitting light was measured with a LCD Viewing Angle Measuring Instrument Ez Contrast manufactured ELDIM. Evaluation was made with a value of (measured value in example/measured value of comparative example)×100%.

Example 1

Used as a light guide plate (L) was a wedge type sidelight light guide plate taken out of a 15 in TFT liquid crystal panel manufactured by International Business Machines Corporation. A peak angle ($\theta_1$) in an emitting light direction was about 80°.

Used as a reflection plate (R) was a silver vapor deposited reflection plate with surface depressions and protrusions, which were formed by transferring a surface profile of a brass mold fabricated by using an epoxy-based UV curable resin (KR400) manufactured by ASAHI DENKA KOGYO Co., Ltd. and cutting a precursor of the mold on a PET substrate with a 100 µm pitch (Lumirror T600, manufactured by TORAY INDUSTRIES, INC.). Silver vapor deposition was conducted on the surface profile to thereby obtain the silver vapor-deposited reflection plate with depressions and protrusions on a surface thereof. A surface of the silver vapor-deposited reflection plate was smooth and of a line type of symmetrical structure (corresponding to FIG. 4). An average angle ($\theta_2$) of surface depressions and protrusions (repetitive slope structure) was about 40°.

Used as a transmittance angle dependent polarizing layer (T2) was a polarizing element (A) having a retardation plate (b1) between two circular polarization type reflection polarizers (a1). Used as the circular polarization type reflection polarizer (a1) was a cholesteric liquid crystal layer with a trade name of PCF 400 manufactured by NITTO DENKO CORPORATION.

Then, a retardation layer (b1 and a negative C-plate) with a front retardation of almost zero, and generating a retardation in an oblique direction was fabricated with a polymerizable liquid crystal according to the following method. LC 242 manufactured by BASF Ltd. was used as a polymerizable mesogen compound. A concrete fabrication method was as follows: A polymerizable mesogen compound was dissolved in cyclopentane (at a concentration of 20 wt %), into which a reaction initiator (1 wt % of IRGACURE 184, manufactured by Ciba Specialty Chemicals Ltd. relative to the mixture) was added to prepare a solution. An alignment substrate that was used was a polyethylene terephthalate film with a trade name of Lumirror having a thickness of 75 µm, manufactured by TORAY INDUSTRIES INC. and the substrate was alignment-treated with a rubbing cloth.

The solution was coated on the substrate to a thickness of 1.2 µm in a dry state using a wire bar to dry the wet coat at 90° C. for 2 min and thereafter, the coat was temporarily heated to an isotropic transition temperature, followed by gradual cooling. The cooled coat was cured by irradiation with ultraviolet (at an incident dose of 10 mW/cm$^2$ for 2 min) in an environment at 80° C. to thereby obtain a negative C-plate. Retardations of the negative C-plate were measured with the results that a retardation in the front direction for light with a wavelength of 550 nm was about 2 nm and a retardation at an inclination angle of 30° was about 140 nm. Four negative C-plates were laminated to obtain a negative retardation plate (b1) with a retardation of 540 nm at an inclination angle of 30°.

A negative C-plate (b1) adhered to the obtained circular polarization type reflection polarizer (a1) on the top thereof using a translucent acrylic-based pressure sensitive adhesive (No. 7, manufactured by NITTO DENKO CORPORATION with a thickness of 23 µm) and thereafter, the substrate was peeled and removed. The circular polarization type reflection polarizer (a1) was further lamination transferred thereon to thereby obtain a polarizing element (A). The polarizing plate (A) worked as the transmittance angle dependent polarizing layer (T2), which transmits circularly polarized light in the front direction, while reflecting all light beams in oblique directions.

A light source was obtained by arranging the light guide plate (L), the reflection plate (R) and the transmittance angle dependent polarizing layer (T2) as shown in FIG. 8.

Comparative Example 1

A light guide plate (L) in use was the same as that of Example 1. A flat plate white PET (E60LL, manufactured by TORAY INDUSTRIES INC., with a thickness of about 190 µm) was used as a reflection plate instead of the reflection plate (R) of Example 1. A prism sheet was used instead of the transmittance angle dependent polarizing layer (T2) of Example 1. Two prism sheets were used, which were BEF films manufactured by 3M (made of polyethylene terephthalate film with a thickness of about 180 µm, an apex angle of about 90° and a prism pitch of 50 µm). A diffusion plate was placed thereon and PCF400 was displaced on the uppermost surface to thereby obtain a light source.

(Evaluation)

(front brightness of Example 1/front brightness of Comparative Example 1)×100=107%

(accumulated light quantity of Example 1/accumulated light quantity of Comparative Example 1)×100=105%

In Example 1, the front brightness and an accumulated light quantity of emitting light beams are larger than the respective corresponding values of Comparative Example 1. In Example 1, light beams were condensed within ±30° of the front direction without a prism sheet. Since the transmittance angle dependent polarizing layer (T2) is a laminate, the layer, in a case where the layer is applied to a liquid crystal display, was able to be adhered to the polarizing plate on the lower surface side of the liquid crystal cell.

Example 2

Used as a light guide plate (L) was a wedge type sidelight light guide plate taken out of a 15.1 inch LCD housing manufactured by Hitachi Ltd. A peak angle ($\theta_1$) in the emitting light direction was about 70°.

A reflection plate (R) was, in a first step, fabricated as a surface profile plate shown in FIG. 3 by emboss rolling a surface of a hard vinyl chloride plate (with a thickness of 1 mm) manufactured by Mitsubishi Plastic, Inc. The plate had a pitch of about 100 µm in raised portions. Aluminum was vacuum vapor deposited on the obtained surface profile to a thickness of 0.1 µm to thereby obtain a reflection plate with depressions and protrusions thereon. An average slope angle ($\theta_2$) of depressions and protrusions on the surface (repetitive slope structure) was about 35°.

Used as a transmittance angle dependent polarizing layer (T2) was a polarizing element (A) with a structure in which a retardation plate (b1) was inserted between linear polarization type reflection polarizers (a2), and layers (b2) each having a front retardation of about λ/4 were arranged on both sides of the retardation plate (b1).

Used as the linear polarization type reflection polarizer (a2) was DBEF manufactured by 3M. The retardation plate (b1) in use was the negative C-plate obtained in Example 1. Arranged as the retardation plates (b2) between which the negative C-plate was sandwiched were λ/4 plates each of which is made of a uniaxially stretched polycarbonate film (NRF film manufactured by NITTO DENKO CORPORATION with a front retardation of 135 nm and a thickness of 50 μm).

The linear polarization type reflection polarizer (a2) was arranged on both outer sides thereof. The linear polarization type reflection polarizer (a2) on the incident side with the transmission axis of 0° as a reference axis, the λ/4 retardation plate at an angle of 45°, the C-plate (with no axis direction), the λ/4 plate at an angle of −45° and the linear polarization type reflection polarizer (a2) on the emitting side with the transmission axis of 90° were laminated in the above axes arrangement with a translucent acrylic-based pressure sensitive adhesive (No. 7, with a thickness of 7.25 μm, manufactured by NITTO DENKO CORPORATION) to thereby the polarizing element (A). The polarizing plate (A) worked as the transmittance angle dependent polarizing layer (T2), which transmits circularly polarized light in the front direction, while reflecting all light beams in oblique directions.

The light source was obtained by arranging the light guide plate (L), the reflection plate (R) and the transmittance angle dependent polarizing layer (T2) as shown in FIG. 8.

Comparative Example 2

A light guide plate (L) in use was the same as that of Example 2. A flat plate white PET (E60LL, manufactured by TORAY INDUSTRIES INC., with a thickness of about 190 μm) was used as a reflection plate instead of the reflection plate (R) of Example 2. A prism sheet was used instead of the transmittance angle dependent polarizing layer (T2) of Example 1. Two prism sheets were used, which were BEF films manufactured by 3M (made of polyethylene terephthalate film with a thickness of about 180 μm, an apex angle of about 90° and a prism pitch of 50 μm). A diffusion plate was placed thereon and DBEF was displaced on the outermost surface to thereby obtain a light source.

(Evaluation)

(front brightness of Example 2/front brightness of Comparative Example 2)×100=110%

(accumulated light quantity of Example 2/accumulated light quantity of Comparative Example 2)×100=108%

In Example 2, the front brightness and the accumulated light quantity of emitting light beams are larger than the respective corresponding values of Comparative Example 2. In Example 2, light beams were condensed within ±40° of the front direction without a prism sheet. Since the transmittance angle dependent polarizing layer (T2) is a laminate, the layer, in a case where the layer is applied to a liquid crystal display, was able to be adhered to the polarizing plate on the lower surface side of the liquid crystal cell.

Example 3

Used as a light guide plate (L) was a two lamp type sidelight light guide plate taken out of a light box (Light Pure-7000pro) manufactured by HakubaPhoto Industry Co., Ltd. A peak angle ($\theta_1$) in the emitting light direction was about 70°.

A reflection plate (R) was obtained as a reflection plate with a surface structure, which corresponds to that shown in FIG. 4 fabricated in a procedure in which a silver vapor deposited PET film (BL film, manufactured by Oike Industrial Co., Ltd., with a thickness of 50 μm) was folded at points with a pitch of 5 mm and the folded film was adhered on a cut aluminum substrate with a ridge repetitive surface structure each of which has a predetermined angle. An average slope angle ($\theta_2$) of the surface structure (a repetitive slope structure) was about 35°. The reflection plate exposes the PET substrate layer of the silver vapor deposited PET film on the front side, while adhering to the aluminum substrate by the vapor deposited surface, and the PET substrate can impart a retardation by the action of uneven birefringence thereof and works as an optical layer (D) having polarization canceling ability. Note that in a case where the optical layer (D) was provided as well, a light beam was, as shown in FIG. 10, reflected at different sites plural times and the light beam passes through the embossed light guide plate (L); therefore, coloration due to a local change in retardation was not practically problematical.

Used as a transmittance angle dependent polarizing layer (T2) was a cholesteric liquid crystal band-pass filter fabricated by coating a thin film with a cholesteric liquid crystal polymer. The filter was a composite of a right circularly polarized light three wavelength selective band-pass filter and a left circularly polarized light three wavelength selective band-pass filter and transmits only light with the specified three wavelengths in the vicinity of the normal direction and reflects obliquely incident light with all wavelengths.

To be detailed, a selective reflection circular polarizing band pass filter was fabricated that has selective reflection wavelength bands in the ranges of from 440 to 490 nm, from 540 to 600 nm and from 615 to 700 nm for an emission spectrum of 435 nm, 535 nm and 610 nm, respectively, of a three wavelength cold cathode tube. A liquid crystal material in use was three kinds of cholesteric liquid crystal polymers having selective reflection central wavelengths of 480 nm, 550 nm and 655 nm, which were produced based on EP No. 0834754 A1.

Cholesteric liquid crystal polymers were produced by polymerization of liquid crystal mixtures of a polymerizable nematic liquid crystal monomer A expressed by the following chemical formula:

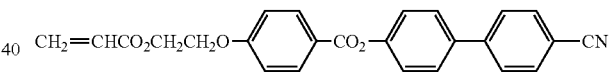

and a polymerizable chiral agent B expressed by the following chemical formula:

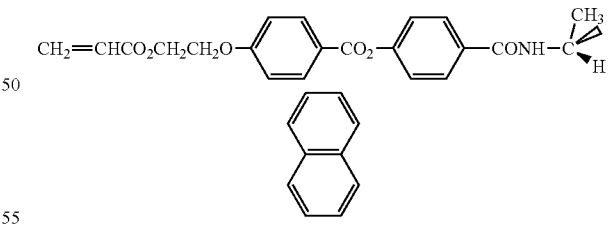

at weight ratios shown below:

| Selective reflection central wavelength (nm) | Monomer A/chiral agent B (mixing ratio) |
| --- | --- |
| 480 nm | 9.81/1 |
| 550 nm | 11.9/1 |
| 665 nm | 14.8/1 |

The liquid crystal mixture was dissolved into terahydrofuran to obtain a 33 wt % solution, thereafter, an atmosphere on/above the solution was purged with nitrogen at 60° C. and then, a reaction initiator (azobisisobutylonitrile at a concentration of 0.5 wt % relative to the mixture) was added to the solution to thereby effect polymerization. The obtained polymer was purified by reprecipitation separation with diethyl ether.

The cholesteric liquid crystal polymer was dissolved into methylene chloride to prepare a 10 wt % solution. The solution was coated on an alignment substrate to a thickness of about 1 μm in a dry state with a wire bar. A polyethylene terephthalate film with a thickness of 75 μm was used as an alignment substrate, a polyvinyl alcohol layer was coated to a thickness of about 0.1 μm on the surface of the film and the polyvinyl alcohol layer was rubbed with a rayon rubbing cloth. After the coating, the alignment substrate was dried for 15 min at 140° C. After the heating, the liquid crystal was cooled and fixed at room temperature to thereby obtain a thin film.

Liquid crystal thin films in RGB colors were fabricated with the cholesteric liquid crystal polymers through a process similar to that as described above and thereafter, the thin films were adhered to one another with an isocyanate-based adhesive (AD244, manufactured by TOKUSHIKI Co., Ltd.). The thin films in R color and G color were adhered to each other between liquid crystal surfaces thereof and then, a PET substrate on the G side was peeled off; and then, the thin films in B color were adhered to each other between liquid crystal surfaces thereof and then a PET substrate on the R side was peeled off. Thereby, the three liquid crystal layers were laminated in order from a shorter wavelength to a longer wavelength to obtain a liquid crystal composite layer (band-pass filter) with a thickness of about 5 μm. A wavelength characteristic of the obtained film is shown in FIG. 25.

On the other hand, a broad band circular polarizing plate, which reflecting left circularly polarized light, was obtained with PCF400 film manufactured by NITTO DENKO CORPORATION. The polarizing plate was laminated on the band-pass filter to thereby obtain a transmittance angle dependent polarizing layer (T2) transmitting left circularly polarized light in the front direction, while reflecting all the light beams in an oblique direction.

A light source was obtained by arranging the light guide plate (L), the reflection plate (R) and the transmittance angle dependent polarizing layer (T2) as shown in FIG. 8.

Comparative Example 3

A light guide plate (L) in use was the same as that of Example 3. A reflection plate (R) was the same as that of Example 3. A PCF 400 cholesteric liquid crystal film was disposed instead of the transmittance angle dependent polarizing layer (T2) to thereby a light source emitting circularly polarized light.

(Evaluation)

(front brightness of Example 3/front brightness of Comparative Example 3)×100=107%

(accumulated light quantity of Example 3/accumulated light quantity of Comparative Example 3)×100=105%

In Example 3, the front brightness and an accumulated light quantity of emitting light beams are larger than the respective corresponding values of Comparative Example 3. In Example 3, front brightness was improved because of light condensation in the front direction. Comparative Example 3 indicates a larger value in comparison between accumulated light quantities, while Comparative Example 3 has a larger emitting light component at a low angle in an oblique direction, but has a smaller emitting light quantity in the range actually used in the vicinity of the front.

Example 4

Used as a light guide plate (L) was a wedge type sidelight light guide plate taken out of a 15.1 inch LCD housing manufactured by Hitachi Ltd. A peak angle ($\theta_1$) in the emitting light direction was about 70°.

A reflection plate (R) was fabricated as follows: a surface profile of a brass mold fabricated by cutting using an epoxy-based UV curable resin (KR400) manufactured by ASAHI DENKA co., LTd. was transferred on a PET substrate with a slope pitch of 100 μm (Lumirror S27, manufactured by TORAY INDUSTRIES, INC.). Aluminum vacuum vapor deposition was conducted to a thickness of 0.1 μm to thereby obtain a reflection plate. The reflection plate was of an asymmetric type (corresponding to FIG. 6). Average slope angles ($\theta_2$) of a repetitive slope structure were about 40° and about 80°.

Used as a transmittance angle dependent layer (T1) was a band-pass filter, fabricated by laminating 21 layers each being a thin film of a structure of $TiO_2$ on $SiO_2$ through a vapor deposition, having a high transmission function, as shown in a graph 1 of the figure, for each of three wavelengths of an emission spectrum from a three wavelength bright line cold cathode tube but reflecting light beams with other wavelengths. A substrate was a PET film (Lumirror manufactured by TORAY INDUSTRIES, INC) with a thickness of 75 μm. With such a band pass filter used, a light condensed characteristic was exerted that emitting light from backlight was reflected in a direction within ±20° of the normal direction and returns to a light source side.

A light source was obtained by arranging the light guide plate (L), the reflection plate (R) and the transmittance angle dependent layer (T1) as shown in FIG. 1.

Comparative Example 4

A light guide plate (L) in use was the same as that of Example 4. A transmittance angle dependent layer (T1) was the same as that of Example 4. A flat plate white PET (E60LL, manufactured by TORAY INDUSTRIES INC., with a thickness of about 190 μm) was used instead of the reflection plate (R) of Example 4 to thereby obtain a light source.

(Evaluation)

(front brightness of Example 4/front brightness of Comparative Example 4)×100=117%

(accumulated light quantity of Example 4/accumulated light quantity of Comparative Example 4)×100=110%

In Example 4, the front brightness and an accumulated light quantity of emitting light beams are larger than the respective corresponding values of Comparative Example 4; a high efficiency of light utilization was certified.

Example 5

A light guide plate (L), a reflection plate (R) and a transmittance angle dependent polarizing layer (T2) in use were the same as those of Example 1.

A light source was obtained by arranging the light guide plate (L), the reflection plate (R) and the transmittance angle dependent polarizing layer (T2). An optical layer (D) having a polarization canceling ability was, as shown in FIG. 10(b), inserted between the light guide plate (L) and the reflection plate (R) and a biaxially stretched PET film (with a thickness of 50 μm) manufactured by TORAY INDUSTRIES INC. was used to thereby obtain a light source.

Comparative Example 5

A light guide plate (L) in use was the same as that of Example 1. An optical layer (D) was similar to that of Example 1 and disposed in a similar way to that in Example 1. A flat plate white PET (E60LL, manufactured by TORAY INDUSTRIES INC., with a thickness of about 190 μm) was used as a reflection plate instead of the reflection plate (R) of Example 1. Prism sheets were used instead of the transmittance angle dependent polarizing layer (T2) of Example 1. Two prism sheets were used, which were BEF films manufactured by 3M (made of polyethylene terephthalate film with a thickness of about 180 μm, a vertical angle of about 90° and a prism pitch of 50 μm). A diffusion plate was placed thereon and PCF400 was disposed on the uppermost surface to thereby obtain a light source.

(Evaluation)

(front brightness of Example 5/front brightness of Comparative Example 5)×100=107%

(accumulated light quantity of Example 5/accumulated light quantity of Comparative Example 5)×100=105%

In Example 5, the front brightness and an accumulated light quantity of emitting light beams are larger than the respective corresponding values of Comparative Example 5. In Example 5, light beams were condensed within ±30° of the front direction without using a prism sheet. Since the transmittance angle dependent polarizing layer (T2) is a laminate, the layer, in a case where the layer is applied to a liquid crystal display, was able to be adhered to the polarizing plate on the lower surface side of the liquid crystal cell.

Example 6

A transmittance angle dependent polarizing layer (T2) was a polarizing element (A) having a retardation plate (b1) inserted between two circular polarization type reflection polarizers (a1). Used as a circular polarization type reflection polarizer (a1) was DBEF manufactured by 3M, which was a linear polarization type reflection polarizer (a2), to which a λ/4 plate (WRF film manufactured by TEIJIN CHEMICAL LTD., with a front retardation of 140 nm) was adhered so that the polarization axis of DBEF forms an angle of 45° relative to the slow axis of the λ/4 plate with an acrylic-based pressure sensitive adhesive (with a product No. 7, manufactured by NITTO DENKO CORPORATION, with a thickness of 25 μm). A retardation plate (b1) in use was a laminate obtained by laminating 5 C-plates fabricated in Example 1, and having a retardation of 660 nm at an inclined angle of 30°. The λ/4 plate sides of the circular polarization type reflection polarizers (a1) were adhered to both sides of the retardation plate (b1) with an acrylic-based pressure sensitive adhesive (with a product No. 7, manufactured by NITTO DENKO CORPORATION, with a thickness of 23 μm). The polarization axes of the linear polarization type reflection polarizers (a2) in the circular polarization type reflection polarizers (a1) arranged on both sides of the retardation plate (b1) was set so as to be in parallel with the slow axis of the λ/4 plate.

The polarizing element (A) worked as the transmittance angle dependent polarizing layer (T2), which transmits polarized light in the front angle, while having reflecting all the light beams in oblique directions. A half value width of an obtained transmittance was equal to that in Example 1. A polarization degree in the front direction was about 95%, which was higher by about 10% than that of Example 1.

The polarizing element (A) was applied to a light source using a light guide plate (L) and a reflection plate (R) similar to those of Example 1. A front brightness of the obtained light source was brighter by 5% than in the Example 1.

Example 7

Used as a transmittance angle dependent polarizing layer (T2) was a polarizing element (A) in which a circular polarization type reflection polarizer (a1) was provided on one side of a retardation plate (b1) and a linear polarization type reflection polarizer (a2) was provided on the other side thereof. Used as the retardation plate (b1) was a laminate obtained by adhering a λ/4 plate (WRF film, manufactured by TEIJIN CHEMICAL LTD., with a front retardation of 140 nm) to the negative C-plate obtained in Example 1 using a Joytack AD175 adhesive manufactured by TOKUSHIKI Co., Ltd. with a laminator. An adhesive layer thickness was several μm. The obtained retardation plate (b1) has a front retardation of about 140 nm and a retardation in an oblique direction relative to a surface of the λ/4 plate in normal planes including the axis direction and the direction perpendicular thereto on the surface of the λ/4 plate of about 540 nm. The circular polarization type reflection polarizer (a1) was disposed with the adhesive so that the cholesteric liquid crystal layer shown below was on the negative C-plate side in the retardation plate (b1) and the DBEF manufactured by 3M as the linear polarization type reflection polarizer (a2) was on the λ/4 plate side.

Cholesteric liquid crystal layers were made of cholesteric liquid crystal polymers produced with selective reflection wavelength bands in the range of 430 nm to 490 nm, in the range of 480 to 550 nm, in the range of 540 to 620 nm, in the range of 620 to 810 nm and in the range of 700 to 900 nm. Five kinds of cholesteric liquid crystal polymers, selective reflection central wavelengths of which were 460 nm, 510 nm, 580 nm, 660 nm and 750 nm, respectively, were produced as liquid crystal materials in use, based on EP No. 0384754 A.

The cholesteric liquid crystal polymers were produced by polymerizing liquid crystal mixtures of a polymerizable nematic liquid crystal monomer α expressed by the following chemical formula:

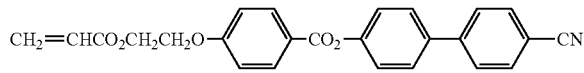

and a polymerizable chiral agent β expressed by the following chemical formula:

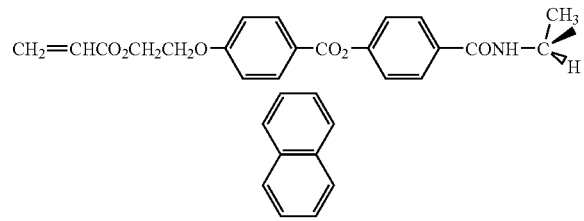

at weight ratios shown below:

| Selective reflection central wavelength (nm) | Monomer α/chiral β (mixing ratio) |
|---|---|
| 460 nm | 9.2/1 |
| 510 nm | 10.7/1 |
| 580 nm | 12.8/1 |
| 660 nm | 14.9/1 |
| 750 nm | 17.0/1 |

A liquid crystal mixture was dissolved in terahydrofuran to obtain a 33 wt % solution, thereafter, an atmosphere on the solution was purged with nitrogen at 60° C. and then, a reaction initiator (azobisisobutylonitrile at a concentration of 0.5 wt % relative to the mixture) was added to the solution to thereby effect polymerization. The obtained polymer was purified by reprecipitation separation with diethyl ether.

The cholesteric liquid crystal polymer was dissolved into methylene chloride to prepare a 10 wt % solution. The solution was coated on an alignment substrate to a thickness of about 1 μm in a dry state with a wire bar. A polyethylene terephthalate film with a thickness of 75 μm was used as the alignment substrate and the surface was rubbed with a rayon rubbing cloth. After the coating, the alignment substrate was dried for 15 min at 140° C. After the heating, the liquid crystal was cooled and fixed at room temperature to thereby obtain a thin film.

An obtained cholesteric liquid crystal circular polarization type reflection polarizer has a selective reflection function at a wavelength in the range of 430 nm to 900 nm and this sample was used as a cholesteric liquid crystal layer.

The polarizing element (A) worked as a transmittance angle dependent polarizing layer (T2), which transmits polarized light in the front direction, while reflecting all the light beams in an oblique direction. A half value width of obtained transmittance values was equal to that of Example 1. A polarization degree of emitting light in the front direction in a case where a cholesteric liquid crystal layer was disposed on a light source side was about 95% and higher by about 10% than that used in Example 1.

The polarizing element (A) was applied to a light source using a light guide plate (L) and a reflection plate (R) similar to those in Example 1 so that a cholesteric liquid crystal layer is disposed on the light source side. A front brightness of the obtained light source was brighter by 5% than in Example 1.

INDUSTRIAL APPLICABILITY

In a light source of the invention, a transmittance angle dependent layer is applied to a sidelight type backlight light guide plate, the light source is less in absorption loss due to repetition of reflection and the like and preferably used in a liquid crystal display.

The invention claimed is:

1. The light source comprising:
a sidelight type backlight light guide plate (L),
a transmittance angle dependent polarizing layer (T2) which transmits a polarized light component of one direction of polarization in normal incident light, and selectively reflects the other polarized light component and reflects obliquely incident light regardless of a direction of polarization is disposed on one surface of the sidelight type backlight light guide plate (L), said transmittance angle dependent polarizing layer (T2) is a polarizing element (A) in which a retardation layer (b) is inserted between at least two reflection polarizers (a) having wavelength bands, overlapped one on the other, of selective reflection of polarized light, and
a reflection plate (R) having a repetitive slope structure is disposed on the other surface of the sidelight type backlight light guide plate (L), wherein
the reflection polarizer (a) is a circular polarization type reflection polarizer (a1) transmitting circularly polarized light, while selectively reflecting reverse circularly polarized light, and
the retardation layer (b) comprises a layer (b1) having a front retardation (in the normal direction) of almost zero and a retardation of λ/8 or more relative to incident light incoming at a direction inclined from the normal direction by 30° or more.

2. The light source comprising:
a sidelight type backlight light guide plate (L),
a transmittance angle dependent polarizing layer (T2) which transmits a polarized light component of one direction of polarization in normal incident light, and selectively reflects the other polarized light component and reflects obliquely incident light regardless of a direction of polarization is disposed on one surface of the sidelight type backlight light guide plate (L), said transmittance angle dependent polarizing layer (T2) is a polarizing element (A) in which a retardation layer (b) is inserted between at least two reflection polarizers (a) having wavelength bands, overlapped one on the other, of selective reflection of polarized light, and
a reflection plate (R) having a repetitive slope structure is disposed on the other surface of the sidelight type backlight light guide plate (L), wherein
the reflection polarizer (a) is a linear polarization type reflection polarizer (a2) transmitting one of linearly polarized lights perpendicular to each other, while selectively reflecting the other thereof,
the retardation layer (b) comprises a layer (b1) having a front retardation (in the normal direction) of almost zero and a retardation of λ/4 or more relative to incident light incoming at a direction inclined from the normal direction by 30° or more,
layers (b2) each having a front retardation of about λ/4 disposed on both sides of the layer (b1), one of the layers (b2) being disposed between the retardation layer (b1) and a corresponding linear polarization type reflection polarizer (a2) and the other of the layers (b2) being disposed between the retardation layer (b1) and another linear polarization type reflection polarizer (a2),
the layer (b2) on the incidence side is arranged at an angle of 45° (−45°)±5° relative to the polarization axis of the linear polarization type reflection polarizer (a2) on the incidence side,
the layer (b2) on the emission side is arranged at an angle of −45° (+45°)±5° relative to the polarization axis of the linear polarization type reflection polarizer (a2) on the emission side, and
the layer (b2) on the incidence side and the layer (b2) on the emission side are arranged at an arbitrary angle formed between the respective slow axes thereof.

3. The light source comprising:
a sidelight type backlight light guide plate (L),
a transmittance angle dependent polarizing layer (T2) which transmits a polarized light component of one direction of polarization in normal incident light, and selectively reflects the other polarized light component and reflects obliquely incident light regardless of a direction of polarization is disposed on one surface of the sidelight type backlight light guide plate (L), said transmittance angle dependent polarizing layer (T2) is a polarizing element (A) in which a retardation layer (b) is inserted between at least two reflection polarizers (a) having wavelength bands, overlapped one on the other, of selective reflection of polarized light, and
a reflection plate (R) having a repetitive slope structure is disposed on the other surface of the sidelight type backlight light guide plate (L), wherein the reflection polarizer (a) is a linear polarization type reflection polarizer (a2) transmitting one of linearly polarized lights perpendicular to each other, while selectively reflecting the other thereof, the retardation layer (b) comprises two biaxial retardation layers (b3) each having a front retardation (in the normal direction) of about $\lambda/4$ and an Nz coefficient of 2 or more, the slow axis direction of the layer (b3) on the incidence side is arranged at an angle of 45° (−45°)±5° relative to the polarization axis of the linear polarization type reflection polarizer (a2) on the incidence side, the slow axis direction of the layer (b3) on the emission side is arranged at an angle of −45° (+45°)±5° relative to the polarization axis of the linear polarization type reflection polarizer (a2) on the emission side, and the layer (b3) on the incidence side and the layer (b3) on the emission side are arranged at an arbitrary angle formed between the respective slow axes thereof.

4. The light source comprising:

a sidelight type backlight light guide plate (L), a transmittance angle dependent polarizing layer (T2) which transmits a polarized light component of one direction of polarization in normal incident light, and selectively reflects the other polarized light component and reflects obliquely incident light regardless of a direction of polarization is disposed on one surface of the sidelight type backlight light guide plate (L), said transmittance angle dependent polarizing layer (T2) is a polarizing element (A) in which a retardation layer (b) is inserted between at least two reflection polarizers (a) having wavelength bands, overlapped one on the other, of selective reflection of polarized light, and a reflection plate (R) having a repetitive slope structure is disposed on the other surface of the sidelight type backlight light guide plate (L), wherein the reflection polarizer (a) is a linear polarization type reflection polarizers (a2) transmitting one of linearly polarized lights perpendicular to each other, while selectively reflecting the other thereof, the retardation layer (b) comprises one biaxial retardation layer (b4) having a front retardation (in the normal direction) of about $\lambda/2$ and an Nz coefficient of 1.5 or more, the slow axis direction of the layer on the incidence side is arranged at an angle of 45° (−45°)±5° relative to the polarization axis of the linear polarization type reflection polarizer (a2) on the incidence side, the slow axis direction of the layer on the emission side is arranged at an angle of −45° (+45°)±5° relative to the polarization axis of the linear polarization type reflection polarizer (a2) on the emission side, and the polarization axes of the two linear polarization type reflection polarizers (a2) are almost perpendicular to each other.

5. The light source comprising:

a sidelight type backlight light guide plate (L), a transmittance angle dependent polarizing layer (T2) which transmits a polarized light component of one direction of polarization in normal incident light, and selectively reflects the other polarized light component and reflects obliquely incident light regardless of a direction of polarization is disposed on one surface of the sidelight type backlight light guide plate (L), said transmittance angle dependent polarizing layer (T2) is a polarizing element (A) in which a retardation layer (b) is inserted between at least two reflection polarizers (a) having wavelength bands, overlapped one on the other, of selective reflection of polarized light, and a reflection plate (R) having a repetitive slope structure is disposed on the other surface of the sidelight type backlight light guide plate (L), wherein at least one reflection polarizer (a) is a circular polarization type reflection polarizer (a1) transmitting circularly polarized light, while selectively reflecting reverse circularly polarized light, at least one reflection polarizer (a) is a linear polarization type reflection polarizer (a2) transmitting one of linearly polarized lights perpendicular to each other, while selectively reflecting the other thereof, and the retardation layer (b) is a layer (b1) having a front retardation (in the normal direction) of almost $\lambda/4$ and a retardation of $\lambda/8$ or more for incident light incoming at a direction inclined from the normal direction by 30° or more.

6. The light source according to any one of claims 1 to 5, wherein an optical layer (D) having a function to cancel polarization of light reflected by the transmittance angle dependent polarizing layer (T2) is disposed between the transmittance angle dependent polarizing layer (T2) and the sidelight type backlight light guide plate (L) or between the sidelight type backlight plate (L) and the reflection plate (R).

7. The light source according to claim 6, wherein the optical layer (D) having polarization canceling ability is placed on a surface of the repetitive slope structure of the reflection plate (R).

8. The light source according to claim 6, wherein the optical layer (D) having polarization canceling ability is a retardation plate.

9. The light source according to any one of claims 1 to 5, wherein an average slope angle $\theta_2$ of the repetitive slope structure of the reflection plate (R) disposed on one surface of the sidelight type backlight light guide plate (L) has the following relation relative to a peak angle $\theta_1$ in an emitting light direction of the sidelight type light guide plate (L):

$\theta_2=(\theta_1/2)\pm10°$.

10. A transmission type liquid crystal display at least comprising: the light source according to any one of claims 1 to 5; a liquid crystal cell; and a polarizing plate disposed on both sides of the liquid crystal cell.

* * * * *